(12) United States Patent
Sugihara et al.

(10) Patent No.: US 8,446,676 B2
(45) Date of Patent: May 21, 2013

(54) HEAD-MOUNTED DISPLAY DEVICE

(75) Inventors: Ryohei Sugihara, Machida (JP); Yoichi Iba, Hachioji (JP); Seiji Tatsuta, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/230,087

(22) Filed: Sep. 12, 2011

(65) Prior Publication Data

US 2012/0069448 A1 Mar. 22, 2012

(30) Foreign Application Priority Data

Sep. 16, 2010 (JP) .................................. 2010-208520
Sep. 16, 2010 (JP) .................................. 2010-208596

(51) Int. Cl.
*G02B 25/00* (2006.01)
*G02B 23/14* (2006.01)
*G02B 27/12* (2006.01)
*G02B 7/02* (2006.01)
*G03H 1/00* (2006.01)
*G03B 21/26* (2006.01)
*G03B 21/30* (2006.01)

(52) U.S. Cl.
USPC ............... 359/643; 359/13; 359/14; 359/432; 359/639; 359/808; 359/618; 359/629; 359/632; 359/633; 359/638; 353/28; 353/72; 353/119

(58) Field of Classification Search
USPC ............... 345/7–9; 353/28, 72, 119; 351/158; 348/115; 359/13–14, 432, 618, 629–633, 359/638–640, 808, 809
See application file for complete search history.

(56) References Cited

U.S. PATENT DOCUMENTS 5,886,822 A * 3/1999 Spitzer .......................... 359/630
6,356,392 B1 * 3/2002 Spitzer .......................... 359/630

FOREIGN PATENT DOCUMENTS

| JP | H07-131740 A | 5/1995 |
| JP | H08-140013 A | 3/1996 |
| JP | H10-074051 A | 3/1998 |
| JP | 2004-029768 A | 1/2004 |

* cited by examiner

*Primary Examiner* — Scott J Sugarman
*Assistant Examiner* — Robert E Tallman
(74) *Attorney, Agent, or Firm* — Scully, Scott, Murphy & Presser, P.C.

(57) ABSTRACT

Provided is a head-mounted display element, including: a first casing (11) which incorporates therein at least a display element (21), and has a light projection window (11a) for projecting image light from the display element (21); a second casing (12) which incorporates therein an eyepiece optical system (31) with a refractive power, and has a light receiving window (12a) for receiving incident image light projected through the light projection window (11a) and an eyepiece window (12b) for emitting the image light that has passed through the eyepiece optical system (31); and a coupling portion (13) for coupling the second casing (12) to the first casing (11) so as to make adjustable a length of an optical path between the light projection window (11a) and the light receiving window (12a).

18 Claims, 21 Drawing Sheets

FIG. 2
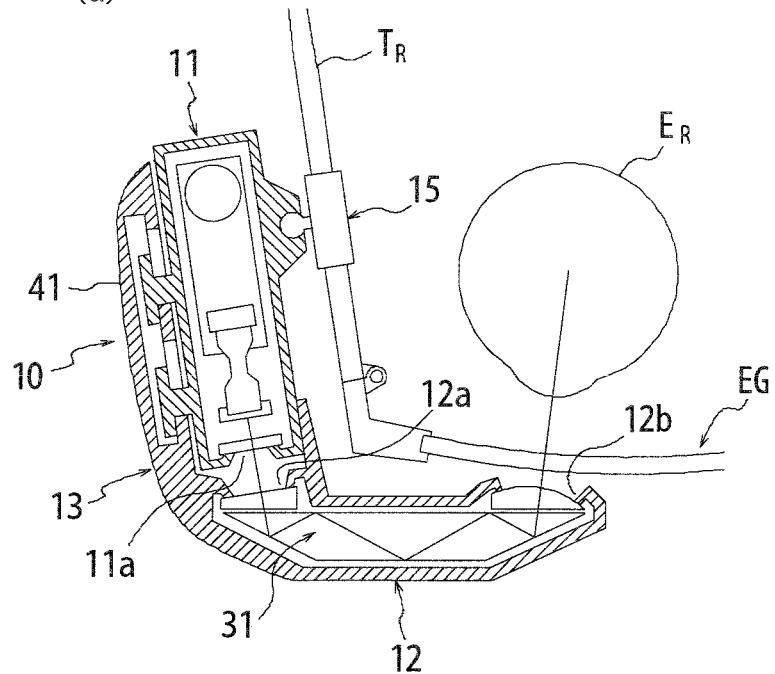
(a)
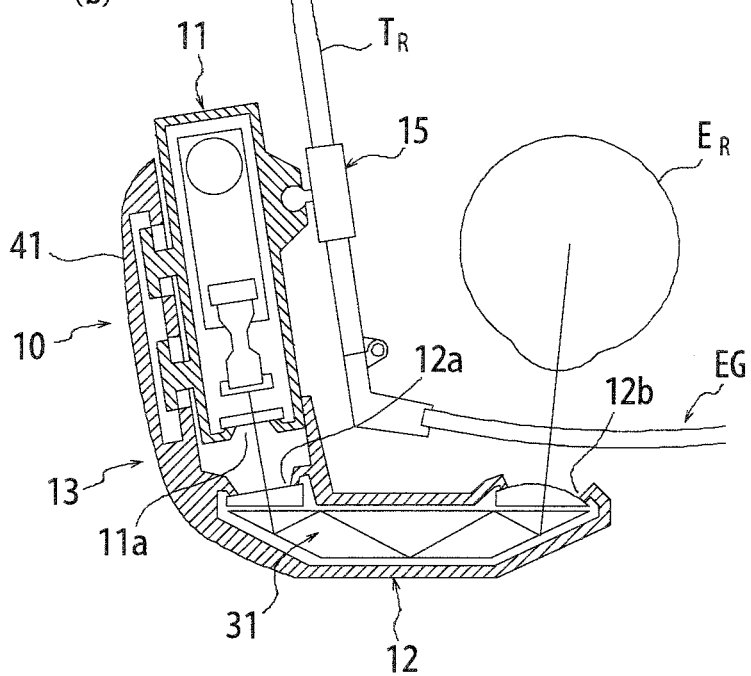
(b)

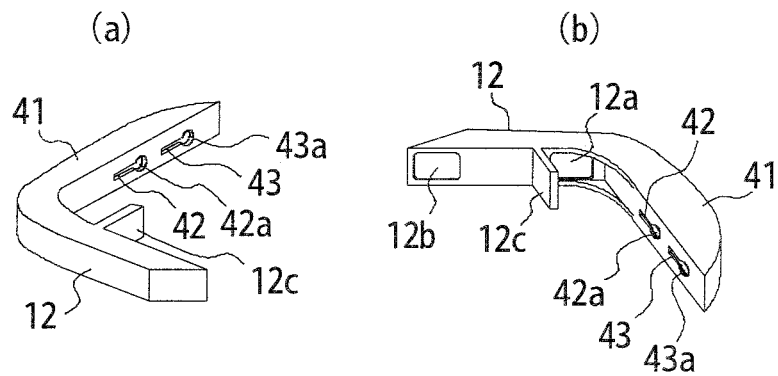
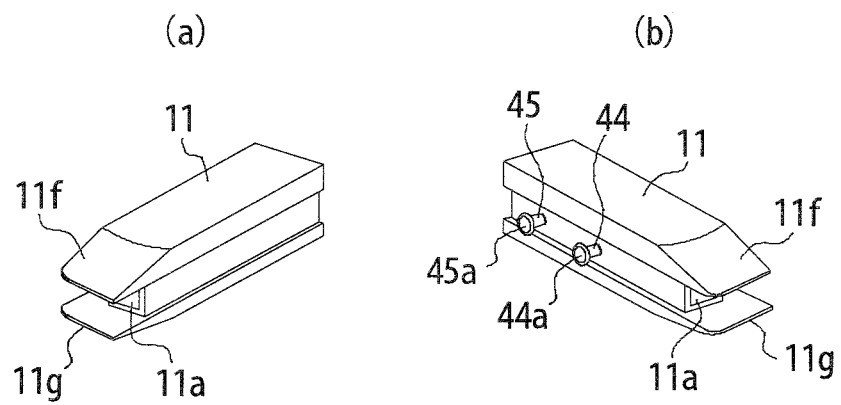
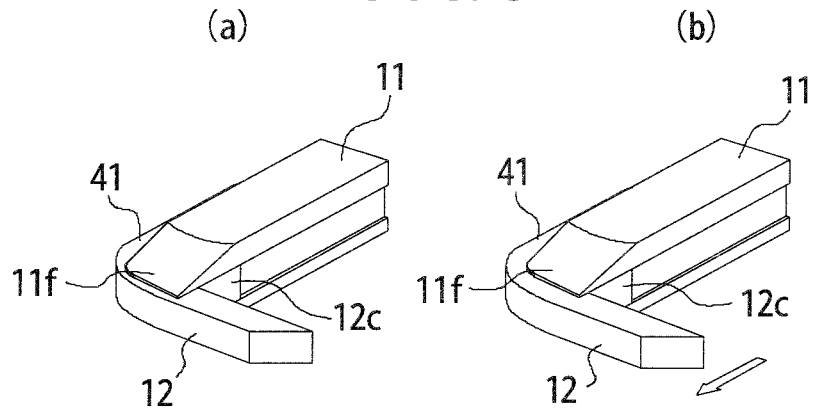

FIG. 18
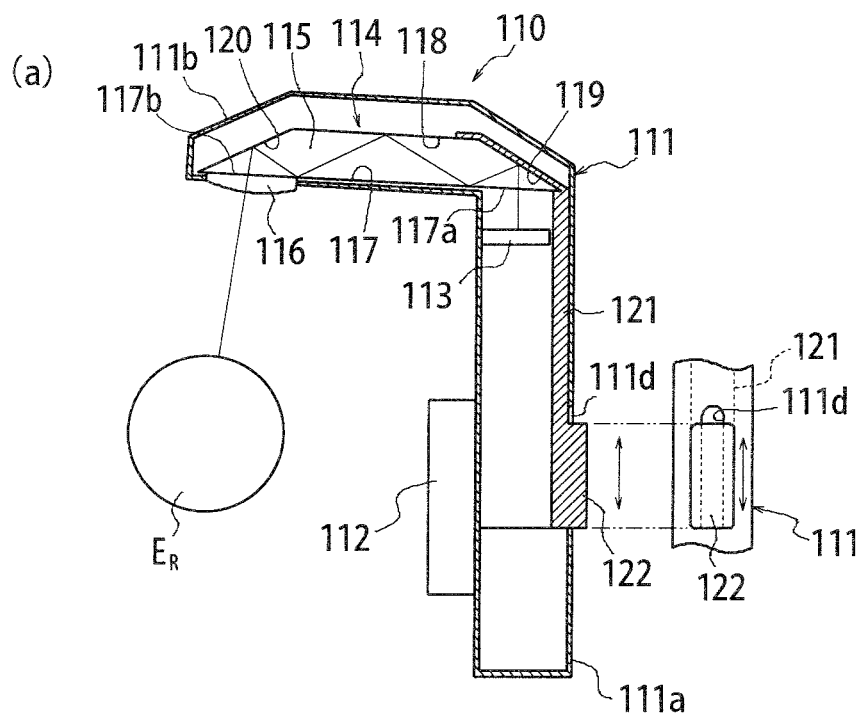
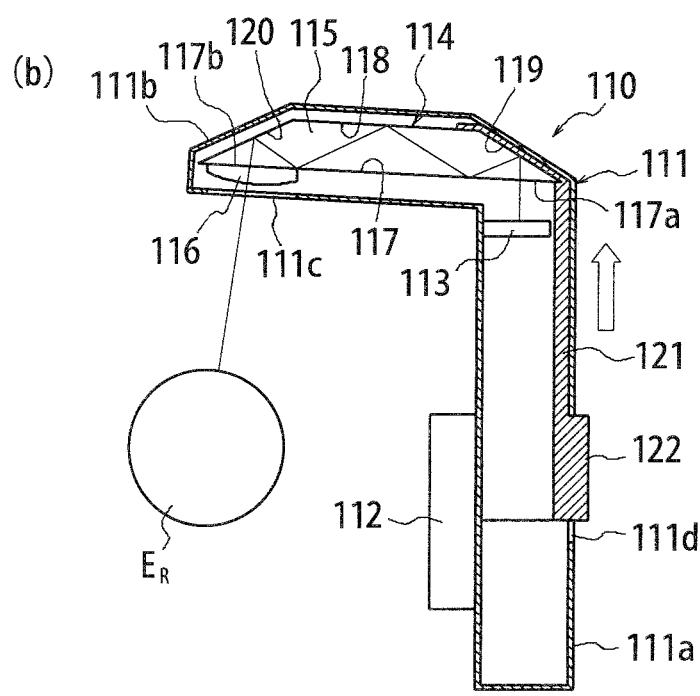

FIG. 19
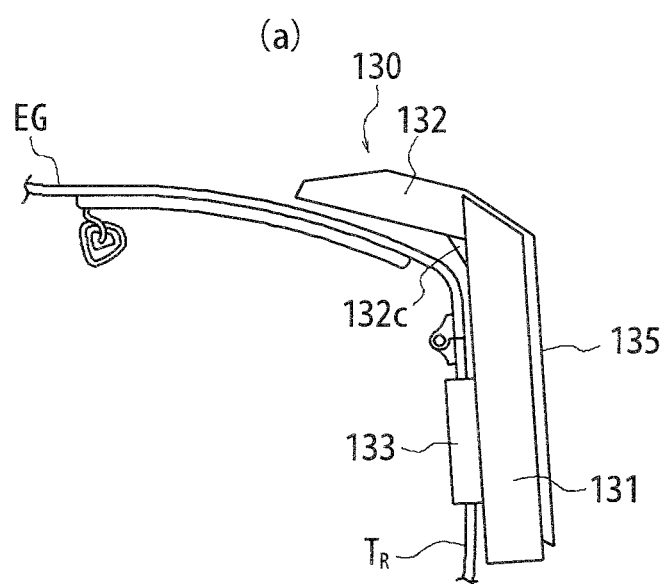
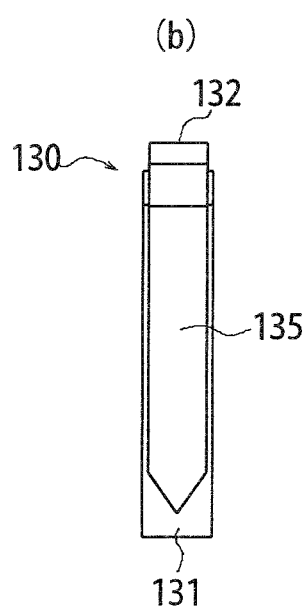

FIG. 25
(a)
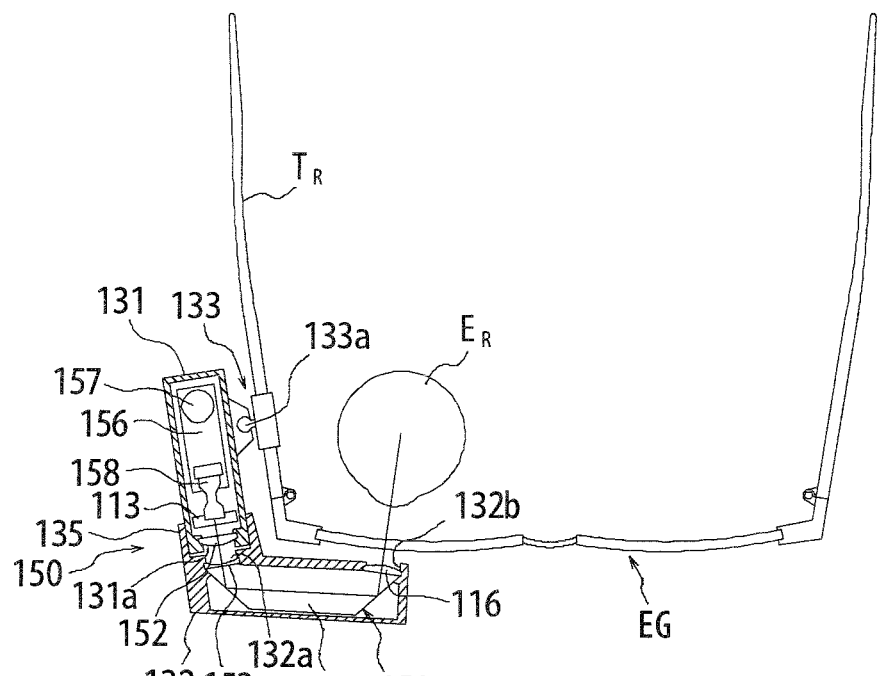
(b)
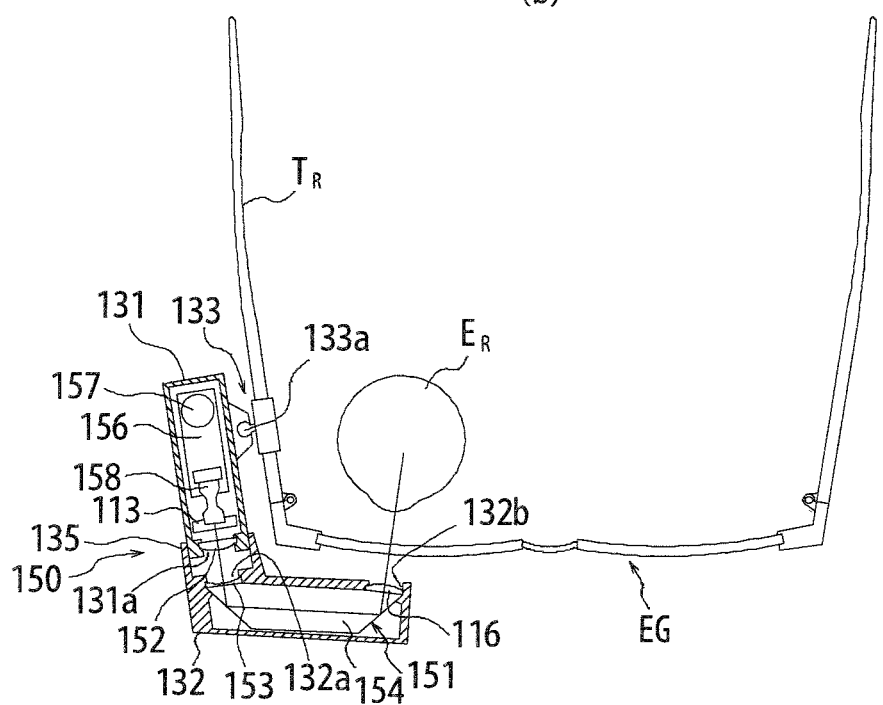

HEAD-MOUNTED DISPLAY DEVICE

TECHNICAL FIELD

The present application claims priority from Japanese Application No. 2010-208596, filed on Sep. 16, 2010 and No. 2010-208520, filed on Sep. 16, 2010, the content of which is incorporated herein by reference.

TECHNICAL FIELD

The present invention relates to a head-mounted display device.

RELATED ART

Conventionally, various display devices have been proposed as a head-mounted display device to be mounted on a human head, which include a display element and an eyepiece optical system so that an image displayed on the display element is magnified for observation as a virtual image through the eyepiece optical system. Such a head-mounted display device is to be worn by individuals, and hence desired to perform display suited to the respective visibility of the individuals.

In order to meet such desire, for example, there is known a display device which includes a moving mechanism for moving the display element in an optical axis direction and an operation portion of the moving mechanism provided outside the casing so as to move the display element via the moving mechanism through the operation of the operation portion (see, for example, JP H07-131740 A and JP H08-140013 A).

There is also known another display device which includes a diopter adjustment knob and has the display element configured to be movable in the optical axis direction with respect to the eyepiece lens through the rotation of the diopter adjustment knob, to thereby allow diopter adjustments to be made (see, for example, JP 2004-29768 A). Further, there is also known further another display device which is configured so that the mounting position of the display unit including the display element and the eyepiece optical system can be adjusted back and forth with respect to the head of the wearer, to thereby make adjustable the position of a virtual image (see, for example, JP H10-74051 A).

DISCLOSURE OF THE INVENTION

A head-mounted display device according to a first aspect of the present invention includes:
a first casing which incorporates therein at least a display element, and has a light projection window for projecting image light from the display element;
a second casing which incorporates therein an eyepiece optical system with a refractive power, and has a light receiving window for receiving the incident image light projected through the light projection window and an eyepiece window for emitting the image light that has passed through the eyepiece optical system; and
a coupling portion for coupling the second casing to the first casing so as to make adjustable a length of an optical path between the light projection window and the light receiving window.

According to a second aspect of the present invention, in the head-mounted display device according to the first aspect,
the first casing is held, when in use, on the side of the head of a user so that the light projection window opens to the same side as the face of the user is directed; and
the second casing is arranged, when in use, so that the light receiving window and the eyepiece window open to the face side of the user.

According to a third aspect of the present invention, in the head-mounted display device according to the first aspect,
the first casing has a guide outside a side surface of the first casing; and
the coupling portion has a slide member which is provided to the second casing and to be guided along the guide so as to be slidably coupled to the first casing.

According to a fourth aspect of the present invention, in the head-mounted display device according to the third aspect,
the first casing and the second casing each have a light shielding member so as to shield external light entering the optical path between the light projection window and the light receiving window, across a slide range of the slide member.

According to a fifth aspect of the present invention, in the head-mounted display device according to the fourth aspect,
the slide member also serves as the light shielding member of the second casing.

According to a sixth aspect of the present invention, in the head-mounted display device according to the third aspect,
the slide member is provided so as to enclose the optical path between the light projection window and the light receiving window.

According to a seventh aspect of the present invention, in the head-mounted display device according to the fourth aspect,
the slide member is detachably attached to the first casing.

According to an eighth aspect of the present invention, the head-mounted display device according to the first aspect further includes a window member transparent with respect to image light from the display element, the window member being provided so as to close up at least one of the light projection window and the light receiving window.

According to a ninth aspect of the present invention, in the head-mounted display device according to the first aspect,
the first casing is held, when in use, on the side of the head of the user so that the light projection window opens inward along the lateral direction with respect to the face of the user; and
the second casing is arranged, when in use, so that the light receiving window opens outward along the lateral direction with respect to the face of the user and the eyepiece window opens to the face side of the user within a view field of an eyeball in the vicinity of the first casing, in front of the face of the user.

According to a tenth aspect of the present invention, in the head-mounted display device according to the first aspect,
the first casing is held, when in use, on the side of the head of the user so that the light projection window opens inward along the lateral direction with respect to the face of the user;
the second casing is arranged, when in use, so that the light receiving window opens outward along the lateral direction with respect to the face of the user and the eyepiece window opens to the face side of the user; and
the coupling portion couples the second casing to the first casing in such a manner that the second casing is slidable in the lateral direction with respect to the user.

According to an eleventh aspect of the present invention, in the head-mounted display device according to the first aspect,
the eyepiece optical system has a positive refractive power and receives the image light incident from the display element, guides the image light to the front of an eyeball of a wearer, and emits the image light toward the eyeball, so as to make observable a virtual image formed by the image light;

the head-mounted display device includes a slide operation portion which is provided so as to be slidable, with respect to the first casing, in an anteroposterior direction of the head of the wearer; and the slide operation portion is coupled to at least either the display element or an optical element in the eyepiece optical system in such a manner that the length of the optical path between the display element and the optical element is increased when the slide operation portion is slid in the anterior direction of the wearer.

According to a twelfth aspect of the present invention, in the head-mounted display device according to the eleventh aspect, the display element is fixed to the first casing;

the optical element is fixed to the second casing; and the slide operation portion is slidably provided to the first casing and coupled to the second casing so as to be attached to the optical element via the second casing.

According to a thirteenth aspect of the present invention, in the head-mounted display device according to the twelfth aspect, the slide operation portion is provided so as to be slidable across an outside surface of the first casing.

According to a fourteenth aspect of the present invention, in the head-mounted display device according to the thirteenth aspect, the slide operation portion is provided so as to be slidable with respect to the first casing so that a virtual image can be observed in the line of sight that slopes downward within a view field of the wearer.

A head-mounted display device according to a fifteenth aspect of the present invention includes:

a display element;

a casing accommodating the display element;

an eyepiece optical system with a positive refractive power, which receives image light incident from the display element, guides the image light to the front of an eyeball of the wearer, and emits the image light toward the eyeball, so as to make observable a virtual image formed by the image light; and a slide operation portion which is provided so as to be slidable, with respect to the casing, in the anteroposterior direction of the head of the wearer, in which the slide operation portion is coupled to at least either the display element or an optical element in the eyepiece optical system in such a manner that a length of an optical path between the display element and the optical element is increased when the slide operation portion is slid in the anterior direction of the wearer.

According to a sixteenth aspect of the present invention, in the head-mounted display device according to the fifteenth aspect, the display element is fixed to the casing; and the optical element is coupled to the slide operation portion.

According to a seventeenth aspect of the present invention, in the head-mounted display device according to the sixteenth aspect, the optical element includes a light guide member that has an incident plane for receiving the image light incident from the display element and an emitting plane for emitting the image light toward the eyeball of the wearer, the incident plane and the emitting plane being located on the near side in relation to the wearer.

According to an eighteenth aspect of the present invention, in the head-mounted display device according to the sixteenth aspect, the casing has a first casing and a second casing;

the display element is fixed to the first casing;

the optical element is fixed to the second casing; and the slide operation portion is slidably provided to the first casing and coupled to the second casing so as to be attached to the optical element via the second casing.

According to a nineteenth aspect of the present invention, in the head-mounted display device according to the eighteenth aspect, the slide operation portion is provided so as to be slidable across an outside surface of the first casing.

According to a twentieth aspect of the present invention, in the head-mounted display device according to the nineteenth aspect, the slide operation portion is provided so as to be slidable with respect to the first casing so that a virtual image can be observed in the line of sight that slopes downward within a view field of the wearer.

Note that the term "casing" according to the present invention refers to a notion including not only a case for storing, inside thereof, an optical element and/or an electronic element, but also a member or the like for guiding light.

BRIEF DESCRIPTION OF THE DRAWINGS

FIGS. 2A and 2B each are an enlarged schematic sectional view of a second casing of FIG. 1 before and after being slid, respectively;

FIGS. 3A and 3B are schematic perspective views of a main part of the second casing viewed from different directions;

FIGS. 4A and 4B are schematic perspective views of a main part of a first casing viewed from inside and outside, respectively;

FIGS. 5A and 5B each are a schematic perspective view of a main part of the second casing of FIG. 1 before and after being slid, respectively;

FIGS. 18A and 18B each are a view illustrating a configuration of a main part of a head-mounted display device according to a seventh embodiment of the present invention;

FIGS. 19A and 19B each are a schematic sectional view illustrating a configuration of a main part of a head-mounted display device according to an eighth embodiment of the present invention;

FIGS. 25A and 25B are transverse sectional views each illustrating a configuration of a main part of a head-mounted display device according to a tenth embodiment of the present invention;

BEST MODES FOR CARRYING OUT THE INVENTION

In the following, embodiments of the present invention are described with reference to the accompanying drawings. In the following embodiments, for the sake of convenience in description, a head-mounted display device for the right eye is described. However, it is needless to say that the head-mounted display device of the present invention is not limited to the right eye, and can also be applied similarly to the left eye.

<First Embodiment>

Figure 1:
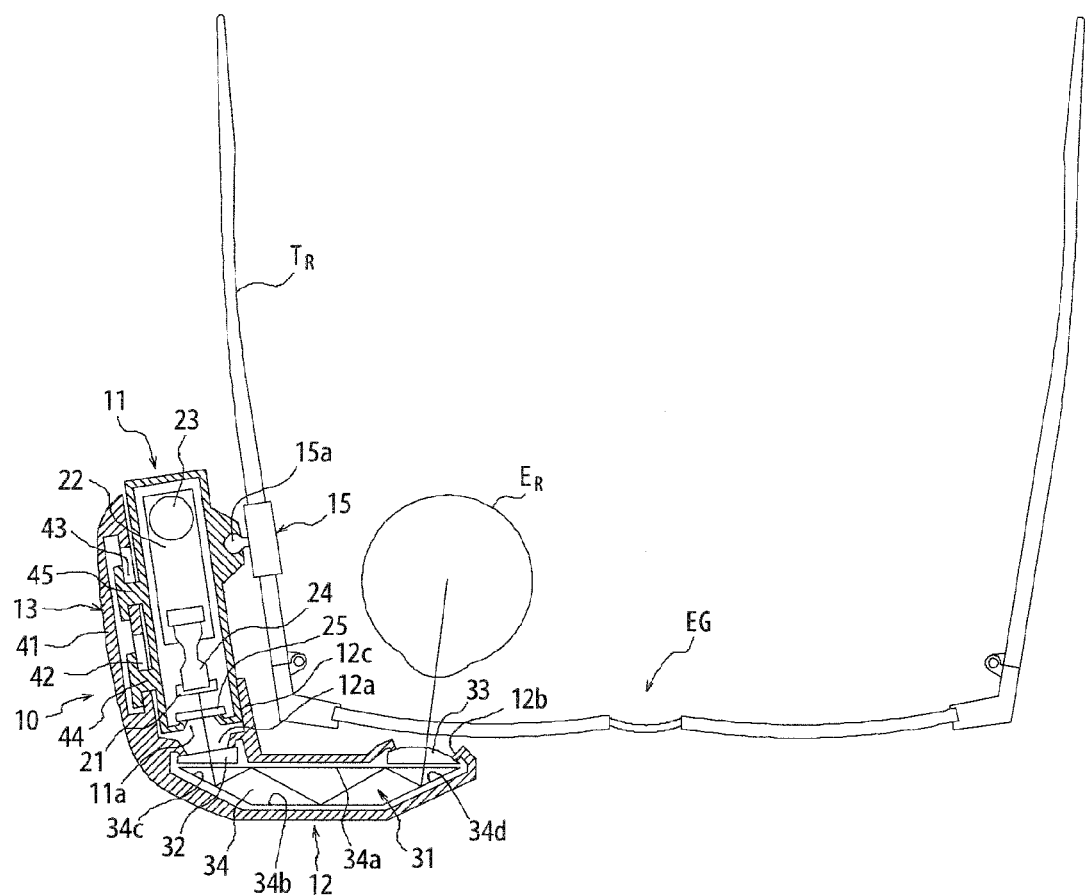
FIG. 1 is a schematic sectional view illustrating a configuration of a main part of a head-mounted display device according to a first embodiment of the present invention.

FIGS. 1 to 5 are views for illustrating a head-mounted display device according to a first embodiment of the present invention. FIG. 1 is a schematic sectional view illustrating a main part configuration of the head-mounted display device according to the first embodiment of the present invention, and FIGS. 2A and 2B each are an enlarged schematic sectional view of a second casing of FIG. 1 before and after being slid, respectively. FIGS. 3A and 3B are schematic perspective views of a main part of the second casing viewed from different directions, FIGS. 4A and 4B are schematic perspective views of a main part of a first casing viewed from inside and outside, respectively, and FIGS. 5A and 5B each are a schematic perspective view of a main part of the second casing of FIG. 1 before and after being slid, respectively.

The head-mounted display device 10 according to this embodiment has the first casing 11, the second casing 12, and a coupling portion 13 for movably coupling the second casing 12 to the first casing 11. The first casing 11 has a fixing portion 15, through which the device is to be attached to a head support portion of a headset or to a temple of eyeglasses. FIG. 1 exemplifies a case where the fixing portion 15 has a ball joint 15a, and the first casing 11 is attached to a temple $T_R$ on the right side of eyeglasses EG via the ball joint 15a.

The first casing 11 is formed in an elongated box shape that extends in an anteroposterior direction when mounted for use to the right side of the head of a user, with an upper surface and a lower surface thereof protruding from both sides thereof. The first casing 11 incorporates therein at least a display panel 21 serving as a display element such as a liquid crystal panel and an organic EL panel. FIG. 1 exemplifies a case where the first casing 11 incorporates therein, other than the display panel 21, electric components such as a circuit board 22 having a drive circuit or the like for the display panel 21 mounted thereon, a button battery 23, and a flexible printed circuit board 24 connecting between the display panel 21 and the circuit board 22. When in use as illustrated in FIG. 1, the first casing 11 has a light projection window 11a formed at the anterior end thereof that opens in the anterior direction, that is, opens to the same side as the face of the use is directed. A window pane 25, which is a window member transparent to image light emitted from the display panel 21, is disposed in the light projection window 11a so as to cover in the opening of the light projection window 11a. Then, the image light from the display panel 21 is adapted to pass through the window pane 25 so as to be projected toward the front of the face of the user from the light projection window 11a.

The second casing 12 is coupled to the first casing 11 via the coupling portion 13, and extends from a leading end portion of the first casing 11 to the front of the right eyeball $E_R$ of the user in a lateral direction at an obtuse angle to the extending direction of the first casing 11. The second casing 12, when in use, has a light receiving window 12a and an eyepiece window 12b formed therein, the light receiving window 12 and the eyepiece window 12b opening to the face side of the user, and incorporates therein an eyepiece optical system 31 between the light receiving window 12a and the eyepiece window 12b. The eyepiece optical system 31 has a prism 32 for optical path length correction which is disposed so as to cover in the opening of the light receiving window 12a, an eyepiece lens 33 that has a positive refractive power and is disposed so as to cover in the eyepiece window 12b, and a light guide member 34 disposed between the prism 32 and the eyepiece lens 33. Accordingly, the prism 32 also acts as a window member of the light receiving window 12a.

The light guide member 34 is formed of a prism in a trapezoidal shape that has a first optical surface 34a with a relatively large area, a second optical surface 34b with a relatively small area which is opposed to the first optical surface 34a, and a third optical surface 34c and a fourth optical surface 34d which are inclined to connect the first optical surface 34a and the second optical surface 34b. The first optical surface 34a has an incident plane for the image light at one end portion, and an emitting plane for the image light on the other end portion.

The image light from the display panel 21 is made incident on the first optical surface 34a through the prism 32, which is then sequentially reflected in the light guide member 34 five times on the third optical surface 34c, on the first optical surface 34a, on the second optical surface 34b, on the first optical surface 34a, and on the fourth optical surface 34d, and then emitted from the emitting plane of the first optical surface 34a to the right eyeball $E_R$ as being condensed by the eyepiece lens 33. This allows the user to observe a virtual image formed by the image light.

The coupling portion 13 includes a slide member 41 with a hollow structure integrally formed with the second casing 12. The slide member 41 is attached onto an outside surface of the first casing 11 so as to be slidable, through a slide operation made by the user, along the extending direction of the first casing 11. For this purpose, as illustrated in FIGS. 3A and 3B, two guide holes 42, 43 are formed on a slide surface side (inside surface side) of the slide member 41 as being spaced apart in the slide direction, the guide holes 42, 43 each extending in the slide direction. Further, as illustrated in FIG. 4B, the coupling portion 13 has, on an outside surface side thereof, guide pins 44, 45 which are to engage with the two guide holes 42, 43 of the slide member 41. The guide pins 44, 45 have flange portions 44a, 45a at the apex thereof, respectively, so as to prevent the guide pins 44, 45 from coming off the corresponding guide holes 42, 43. Further, the guide holes 42, 43 have openings 42a, 43a formed at an end thereof so as to allow the flange portions 44a, 45a of the corresponding guide pins 44, 45 to be inserted and removed therethrough.

This configuration allows the second casing 12 to be detachably coupled to the first casing 11 via the coupling portion 13. Then, the second casing 12 is made slidable, through the slide operation of the slide member 41 by the user, when in use as being coupled to the first casing 11, in the extending direction of the first casing 11, that is, in the anteroposterior direction of the head of the user. Further, when in use, the guide holes 42, 43 formed in the slide member 41 and the guide pins 44, 45 formed in the outside surface of the first casing 11 are not visible externally, which is also favorable in appearance. The slide member 41 can be operated so as to be retained at an arbitrary slide position, with the aid of friction against the first casing 11 or a known slide support mechanism (not shown).

Further, the first casing 11 is provided with light shielding members 11f, 11g, which are formed to protrude forward from upper and lower surfaces across the slide range of the slide member 41 so as to vertically sandwich the second casing 12. The second casing 12 is provided with a light shielding member 12c, which is formed across the slide operation range of the slide member 41 so as to be slidable across the inside surface of the first casing 11, in such a manner that the leading end portion of the first casing 11 is laterally sandwiched between the light shielding member 12c and the slide member 41. With this configuration, the optical path between the light projection window 11a and the light receiving window 12a is in conjunction with the slide member 41 so as to be shielded from external light across the slide range of the slide member 41.

According to the head-mounted display device 10 of this embodiment, for example, when the slide member 41 of FIGS. 2A and 5A is moved in an anterior direction by the user, the second casing 12 is moved integrally with the slide member 41 in the same direction as illustrated in FIGS. 2B and 5B. In this manner, the optical path length between the light projection window 11a of the first casing 11 and the light receiving window 12a of the second casing 12 is adjusted. Specifically, when the second casing 12 is changed from the state of FIG. 2A to the state of FIG. 2B, the distance between the display panel 21 accommodated in the first casing 11 and the eyepiece optical system 31 accommodated in the second casing 12 is increased. To be more precise, the optical path length between the display panel 21 and the eyepiece lens 33 is increased, with the result that a position of a virtual image to be formed by the image light moves further away.

Accordingly, the slide member 41 and the virtual image move in the same direction, which allows the user to make diopter adjustments through an intuitive slide operation. Further, the guide pins 44, 45 are spaced apart in the extending direction of the first casing 11, and hence along distance can be secured therebetween, which causes less runout of the guide, to thereby allow stable diopter adjustments to be made. Further, the first casing 11 and the second casing 12 each have, inside thereof, no moving mechanism for diopter adjustments, and hence do not suffer from grit and dust which are otherwise generated due to the grinding down of a sliding member resulting from the sliding or the like of the moving mechanism. Further, both of the first casing and the second casing can be increased in sealing performance with ease. The display panel 21 is fixed while the eyepiece optical system 31 is slid, and hence the slide operation does not cause the electric components to move, which is less likely to cause trouble. Further, the slide member 41 is attached to an outside surface of the first casing 11, which allows the user to operate the slide member 41 with ease without taking off the device.

Further, the optical path between the light projection window 11a of the first casing 11 and the light receiving window 12a of the second casing 12 is in conjunction with the slide member 41 so as to be completely enclosed, across the slide range of the slide member 41, by the light the light shielding members 11f, 11g of the first casing 11 and the light shielding member 12c of the second casing 12. In this manner, external light is shielded from entering the optical path, so that a virtual image of stable quality can be observed irrespective of the amount of diopter adjustments. Further, external light is prevented from entering the light projection window 11a and the light receiving window 12a, which effectively prevents grit and dust from adhering to an outer surface of the window pane 25 of the light projection window 11a and to an outside surface of the prism 32 of the light receiving window 12a. As a result, an image of excellent quality can be stably observed for a prolonged period of time. Further, the slide member 41 provided to the second casing 12 is detachably attached to the first casing 11. Therefore, even in a case where grit and dust are adhered to outer surfaces of the window pane 25 and the prism 32, the slide member 41 can be detached from the first casing 11 so as to separate the first casing 11 and the second casing 12 from each other, to thereby allow the window pane 25 and the prism 32 to be cleaned. Further, the light shielding members 11f, 11g do not cover the right and left sides of the window pane 25, and hence the window pane 25 can be cleaned thoroughly with ease from right and left using a cotton swab or the like. Similarly, the prism 32 can be cleaned thoroughly with ease from above and below using a cotton swab or the like.

The first casing 11 is fixed to the temple $T_R$ of the eyeglasses EG through the fixing portion 15 having the ball joint 15a. Therefore, in addition to the diopter adjustments through the anteroposterior movement of the second casing 12 made by the slide member 41, the first casing 11 and the second casing 12 can be integrally moved so as to be turned from side to side and up and down about the ball joint 15a, to thereby adjust the position of the eyepiece window 12b from side to side and up and down so as to be located in front of the right eyeball $E_R$.

<Second Embodiment>

Figure 6:
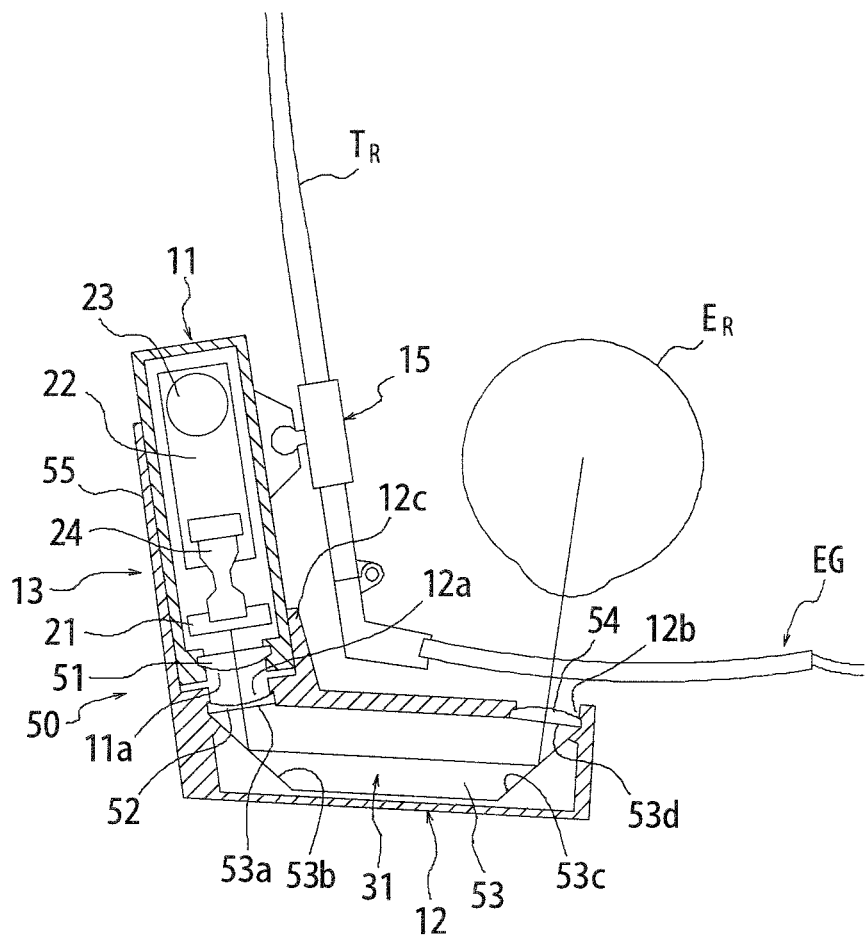
FIG. 6 is a schematic sectional view illustrating a main part configuration of a head-mounted display device according to a second embodiment of the present invention.
Figure 7:
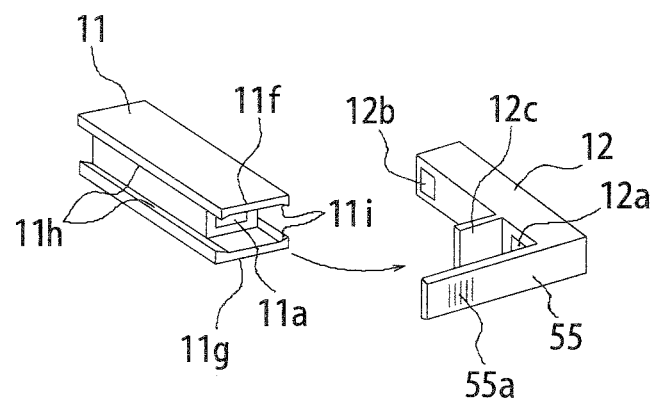
FIG. 7 is a schematic perspective view of a first casing and a second casing of FIG. 6 which are separated from each other.
Figure 8:
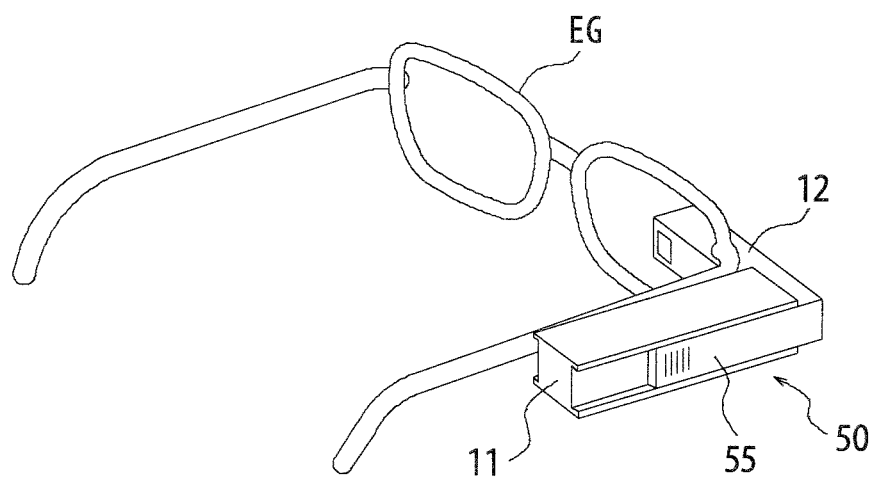
FIG. 8 is a schematic perspective view illustrating the head-mounted display device of FIG. 6 which is attached to eyeglasses.

FIGS. 6 to 8 are views for illustrating ahead-mounted display device according to a second embodiment of the present invention. FIG. 6 is a schematic sectional view illustrating a main part configuration of a head-mounted display device; FIG. 7 is a schematic perspective view of the first casing and the second casing which are separated from each other; and FIG. 8 is a schematic perspective view illustrating the head-mounted display device attached to the eyeglasses EG. The head-mounted display device 50 according to this embodiment is different from the head-mounted display device 10 according to the first embodiment mainly in terms of configuration of the eyepiece optical system 31 and the coupling portion 13. Therefore, the constituent elements that function similarly to those of the head-mounted display device 10 of the first embodiment are denoted by the same reference symbols, and the description thereof is omitted.

The eyepiece optical system 31 includes a first lens 51 with a positive refractive power, the second lens 52 with a negative refractive power, a light guide member 53, and an eyepiece lens 54 with a positive refractive power, so that the eyepiece optical system 31 has a positive refractive power as a whole. The first lens 51 is disposed in the first casing 11 so as to cover in the light projection window 11a of the first casing 11. The second lens 52 is disposed in the second casing 12 so as to cover in the light receiving window 12a of the second casing 12. The eyepiece lens 54 is disposed in the second casing 12 so as to cover in the eyepiece window 12b of the second casing 12.

The light guide member 53 is formed of a prism, which is configured in such a manner that image light that has passed through the second lens 52 and made incident from an incident plane 53a is sequentially reflected twice on a reflecting plane 53b and a reflecting plane 53c, and caused to pass through the eyepiece lens 54 to be output from an emitting plane 53d to the same side as the incident side. The incident plane 53a is worked so as to be orthogonal to the optical axis of the eyepiece optical system 31, that is, the central ray of the incident image light, and the second lens 52 is cemented to the incident plane 53a. The emitting plane 53d of light guide member 53 is worked so as to be orthogonal to the optical axis of the eyepiece optical system 31, that is, the central ray of the image light reflected on the reflecting plane 53c, and the eyepiece lens 54 is cemented to the emitting plane 53d.

The coupling portion 13 includes a slide member 55 in a plate shape integrally formed to the second casing 12. The slide member 55, for example, detachably engages with dovetail grooves 11h forming the coupling portion 13, the dovetail grooves 11h being formed on the outside surface side of the first casing 11, and slides across the outside surface of the first casing 11 along the extending direction of the first casing 11. Similarly, the light shielding member 12c formed to the second casing 12, for example, detachably engages with dovetail grooves 11i formed on an inside surface side of the first casing 11, and slides across the inside surface of the first casing 11 along the extending direction of the first casing 11. Note that the slide member 55 has an operation portion 55a to be touched by the finger of the user, which is formed on the outside surface of the slide member 55. The operation portion 55a has nonslip means formed thereto, the nonslip means having a plurality of protrusions or grooves in thin strings or a plurality of asperities.

According to the head-mounted display device 50 of this embodiment, the slide member 55 coupled to the second casing 12 is slide-operated with respect to the first casing 11, to thereby adjust the optical path length between the first lens 51, which forms the eyepiece optical system 31 and is provided to the light projection window 11a of the first casing 11, and the second lens 52, which forms the eyepiece optical system 31 and is provided to the light receiving window 12a of the second casing 12, so that the optical path length is increased as the second casing 12 is moved forward. Further, the optical path length between the light projection window 11a of the first casing 11 and the light receiving window 12a of the second casing 12 is enclosed by the slide member 55, the light shielding members 11f, 11g of the first casing 11, and the light shielding member 12c of the second casing 12, across the slide range of the slide member 55. Therefore, the similar effects as in the case of the first embodiment can be obtained.

In this embodiment, the eyepiece lens 54 is cemented to the emitting plane 53d of the light guide member 53, and hence the second casing 12 may be configured to hold the light guide member 53 only by the incident side thereof, with the emitting side of the light guide member 53 being exposed. In this case, the light guide member 53 may also be inclusively assumed as part of the second casing. Further, although the second casing 12 and the light guide member 53 can be removed for cleaning dust or water adhered thereto, it involves difficulty in removing the first casing 11 for cleaning water or dust that has entered because the first casing 11 includes the display panel 21 and a circuit for driving the display panel. Therefore, it is important to form the first casing 11 so as to exhibit high sealing performance.

<Third Embodiment>

Figure 9:
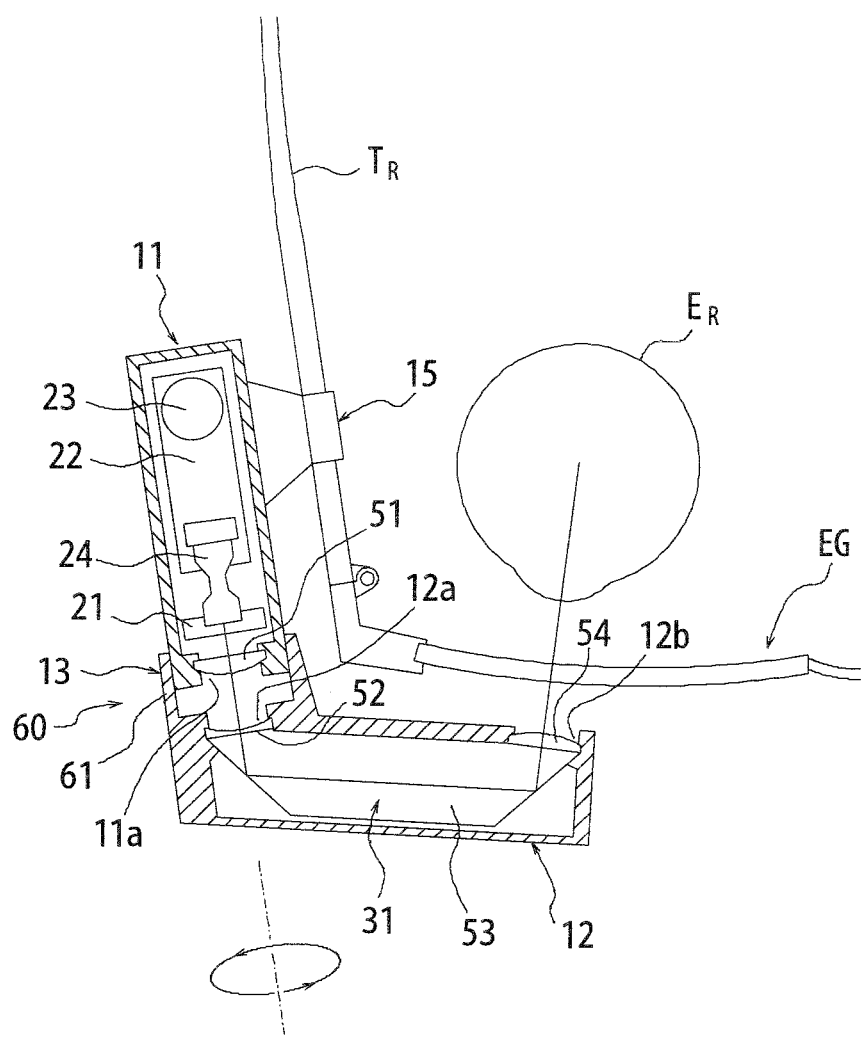
FIG. 9 is a schematic sectional view illustrating a main part configuration of a head-mounted display device according to a third embodiment of the present invention.
Figure 10:
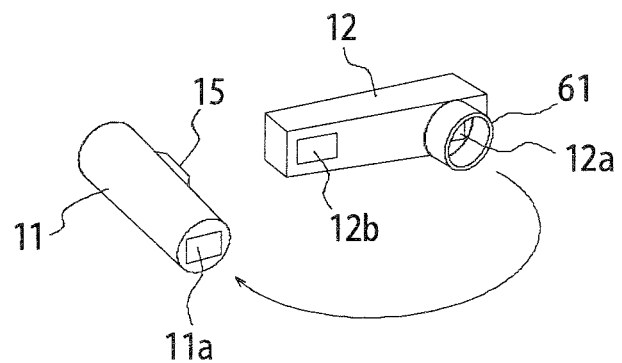
FIG. 10 is a schematic perspective view of a first casing and a second casing of FIG. 9 which are separated from each other.
Figure 11:
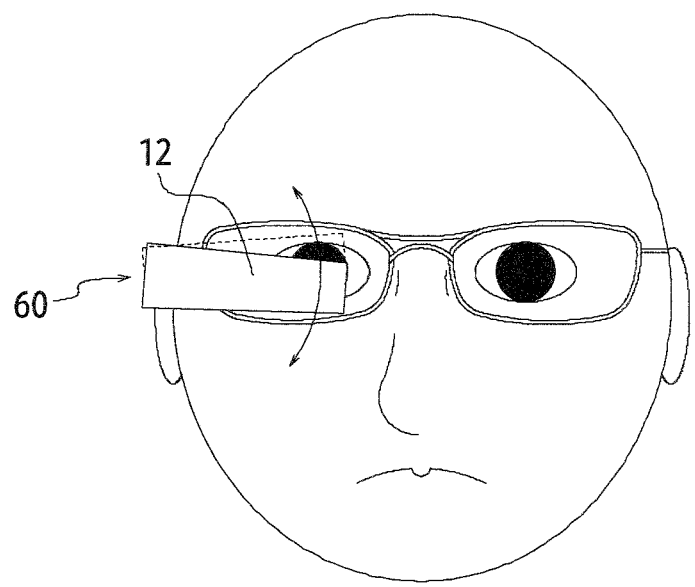
FIG. 11 is a view for illustrating how the head-mounted display device of FIG. 9 is used.

FIGS. 9 to 11 are views for illustrating a head-mounted display device according to a third embodiment of the present invention. FIG. 9 is a schematic sectional view illustrating a main part configuration of the head-mounted display device; FIG. 10 is a schematic perspective view of the first casing and the second casing which are separated from each other; and FIG. 11 is a view for illustrating how the head-mounted display device is used. The head-mounted display device 60 according to this embodiment is different from the head-mounted display device 50 according to the second embodiment mainly in terms of configuration of the first casing 11 and the coupling portion 13. Therefore, the constituent elements that function similarly to those of the head-mounted display device 50 of the second embodiment are denoted by the same reference symbols, and the description thereof is omitted.

Specifically, in this embodiment, the first casing 11 is formed to have a tubular outer shape, and configured to be fixed to the temple $T_R$ of the eyeglasses EG via the fixing portion 15.

Further, the coupling portion 13 has a tubular member 61 integrally formed with the second casing 12. The tubular member 61 is held at the leading end portion of the first casing 11 in a tubular shape as being turnably engaged therewith so as to be slidable in the axial direction. With this configuration, the second casing 12 can be slid in the axial direction of the first casing 11 via the tubular member 61 so as to make diopter adjustments. Further, the second casing 12 can be turned via the tubular member 61 with respect to the first casing 11 so as to adjust the position of the eyepiece window 12b in a vertical direction (height direaction) within the view field.

According to the head-mounted display device 60 of this embodiment, the similar effects as in the case of the second embodiment can be obtained. In particular, in this embodiment, the optical path between the light projection window 11a of the first casing 11 and the light receiving window 12a of the second casing 12 is completely enclosed by the tubular member 61, across the moving range of the second casing 12 in the anteroposterior direction. Therefore, the device can be further improved in light-shielding property and dust-proof property.

<Fourth Embodiment>

Figure 12:
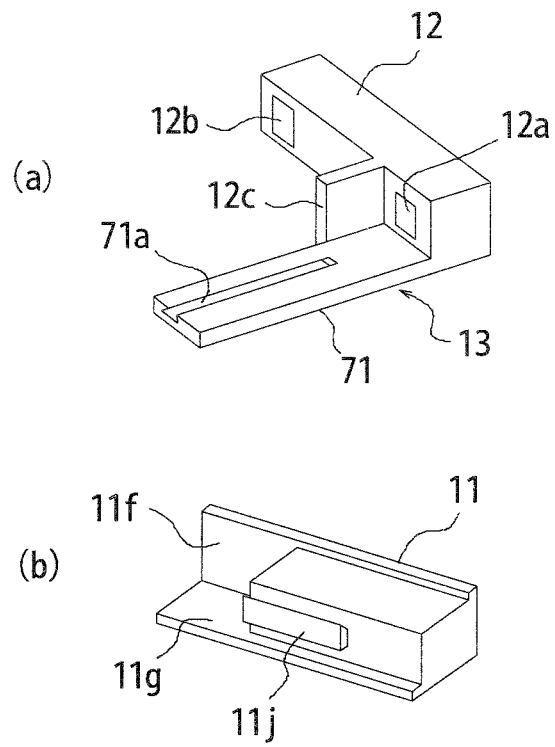
FIGS. 12A and 12B are schematic perspective views of a second casing and a first casing of a head-mounted display device according to a fourth embodiment of the present invention, the second casing and the first casing being separated from each other.
Figure 13:
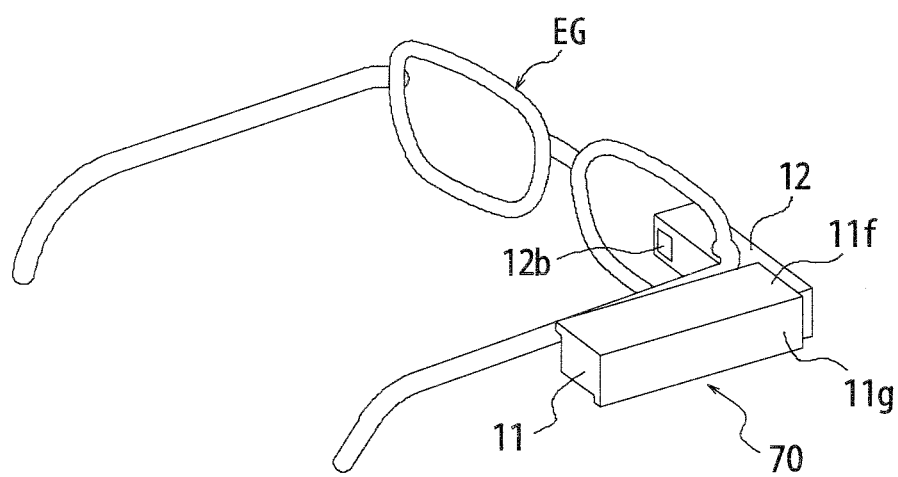
FIG. 13 is a schematic perspective view of the head-mounted display device of FIGS. 12A and 12B, which is attached to eyeglasses.

FIGS. 12 and 13 are views for illustrating a head-mounted display device according to a fourth embodiment of the present invention. FIGS. 12A and 12B are schematic perspective views of the second casing and the second casing of a head-mounted display device according to the fourth embodiment of the present invention, the second casing and the first casing being separated from each other; and FIG. 13 is a schematic perspective view of the head-mounted display device attached to the eyeglasses EG. The head-mounted display device 70 according to this embodiment is different from the head-mounted display device 50 according to the second embodiment mainly in terms of configuration of the coupling portion 13 and the light shielding member 12c. Therefore, the constituent elements that function similarly to those of the head-mounted display device 50 of the second embodiment are denoted by the same reference symbols, and the description thereof is omitted.

Specifically, the coupling member 13 includes a slide member 71 in a plate shape integrally formed to the second casing 12, so as to slide across the lower surface of the first casing 11. The slide member 71 has, for example, a dovetail groove 71a formed on a slide surface side thereof, while the first casing 11 has a tenon 11j formed in a lower surface thereof, which is to be detachably engaged with the dovetail groove 71a of the slide member 71. Then, the second casing 12 is coupled to the first casing 11 through the engagement between the dovetail groove 71a of the slide member 71 and the tenon 11j of the first casing 11 so as to be slidable with respect to the first casing 11, in the anteroposterior direction of the head of the user. With this configuration, the diopter adjustments can be made through slide operation of the slide member 71.

Further, the light shielding member 12c of the second casing 12 is formed as being coupled to the slide member 71 so as to be located inside (on the head side) when in use. Accordingly, the light shielding member 12c forms an L-angle together with the slide member 71. Further, the light shielding members 11f, 11g of the first casing 11 are formed so as to protrude forward from the upper surface and the outside surface when in use. Accordingly, the light shielding members 11f, 11g form an L-angle. Then, when in use, the optical path between the light projection window 11a of the first casing 11 and the light receiving window 12a of the second casing 12 is enclosed by the slide member 71, and the light shielding members 11f, 11g, across the slide range of the slide 110 member 71, so that external light is shielded from entering the optical path.

According to the head-mounted display device 70 of this embodiment, the similar effects as in the case of the second embodiment can be obtained. In particular, in this embodiment, an L-angle on the first casing 11 side is formed by the light shielding members 11f, 11g, while an L-angle on the second casing 12 side is formed by the slide member 71 and the light shielding member 12c. Therefore, even when the light shielding members 11f, 11g, or the slide member 71 and the light shielding member 12c are reduced in thickness, the strength can be secured with ease, which attains reduction in weight.

<Fifth Embodiment>

Figure 14:
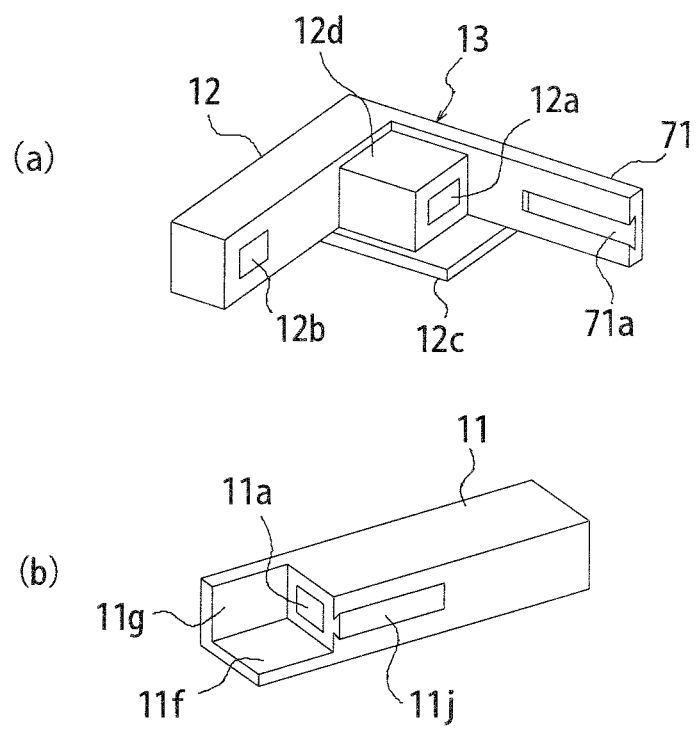
FIGS. 14A and 14B are schematic perspective views of a second casing and a first casing of a head-mounted display device according to a fifth embodiment of the present invention, the first casing and the second casing being separated from each other.
Figure 15:
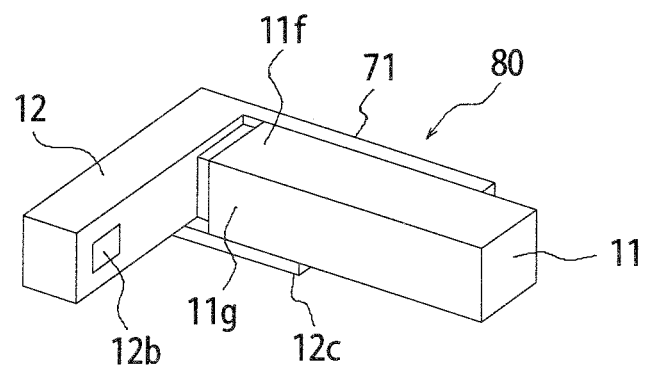
FIG. 15 is a schematic perspective view of the first casing and the second casing of FIGS. 14A and 14B, which are coupled to each other.
Figure 16:
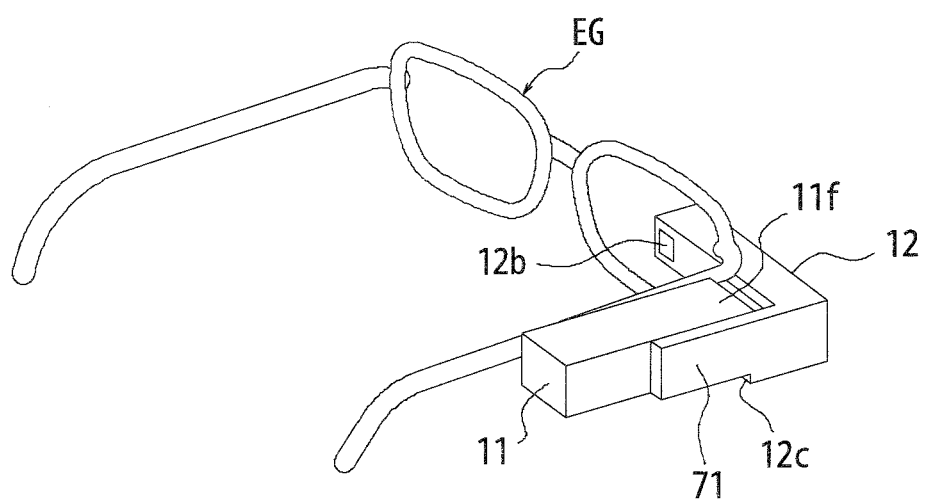
FIG. 16 is a schematic perspective view illustrating the head-mounted display device of FIG. 15 that is attached to eyeglasses.

FIGS. 14, 15, and 16 are views for illustrating a head-mounted display device according to a fifth embodiment of the present invention. FIGS. 14A and 14B are schematic perspective views of the second casing and the first casing of the head-mounted display device, the first casing and the second casing being separated from each other; FIG. 15 is a schematic perspective view of the first casing and the second casing, which are coupled to each other; and FIG. 16 is a schematic perspective view illustrating the head-mounted display device attached to the eyeglasses EG. The head-mounted display device 80 of this embodiment is different from the head-mounted display device 70 of the fourth embodiment mainly in terms of configuration of the coupling portion 13, the second casing 12, and the light shielding member 12c. Therefore, the constituent elements that function similarly to those of the head-mounted display device 70 of the fourth embodiment are denoted by the same reference symbols, and the description thereof is omitted.

Specifically, the slide member 71 forming the coupling member 13 is integrally formed to the second casing 12 so as to slide across the outside surface of the first casing 11. For this purpose, a tenon 11j is formed on the outside surface of the first casing 11, so as to be detachably engaged with the dovetail groove 71a of the slide member 71.

Further, the light receiving window 12a of the second casing 12 is formed in a projecting window portion 12d in a box shape, and the light shielding member 12c is formed, on the lower surface side of the projecting window portion 12d, so as to protrude from the projecting window portion 12d to the first casing 11 side. Here, the light shielding member 12c is integrally formed to the slide member 71, so as to form an L-angle together with the slide member 71.

Further, the light shielding members 11f and 11g of the first casing 11 are integrally formed as protruding forward so as to slide across an upper surface and an inside surface of the projecting window portion 12d, and form an L-angle. When in use, the optical path between the light projection window 11a of the first casing 11 and the light receiving window 12a of the second casing 12 is enclosed by the slide member 71 and the light shielding members 11f, 11g, 12c, across the slide range of the slide member 71, so that, similarly to the above-mentioned embodiments, external light is shielded from entering the optical path. Therefore, even in this embodiment, the similar effects as in the case of the fourth embodiment can be obtained.

<Sixth Embodiment>

Figure 17:
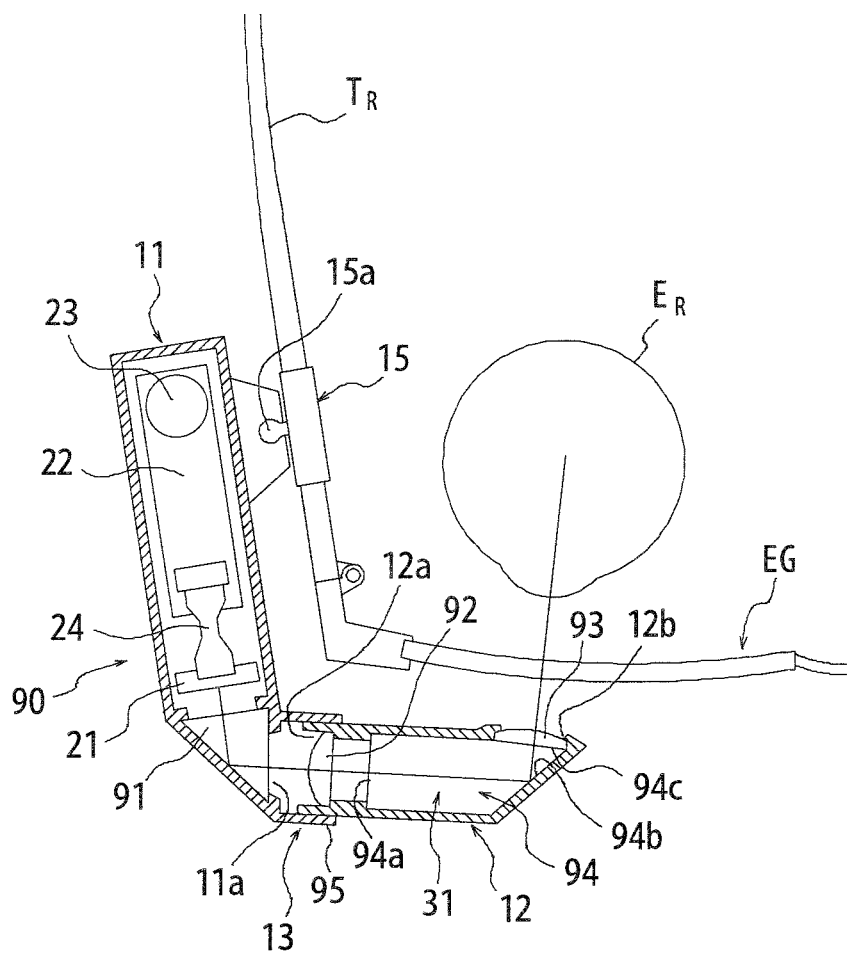
FIG. 17 is a schematic sectional view illustrating a configuration of a main part of a head-mounted display device according to a sixth embodiment of the present invention.

FIG. 17 is a schematic sectional view illustrating a configuration of a main part of a head-mounted display device according to a sixth embodiment of the present invention. The constituent elements that function similarly to those in the above-mentioned embodiments are denoted by the same reference symbols, and the description thereof is omitted.

In the head-mounted display device 90 of this embodiment, when in use, the light projection window 11a of the first casing 11 opens inward along the lateral direction with respect to the face of the user. Further, a total reflecting prism 91 is incorporated in the first casing 11 so as to cover the light projection window 11a. With this configuration, image light emitted from the display panel 21 is subjected to total reflection and emitted from the light projection window 11a.

The second casing 12 is coupled to the first casing 11 via the coupling portion 13, and has the light receiving window 12a that opens outward, when in use, along the lateral direction with respect to the face of the user, in front of the face of the user, so that the eyepiece window 12b is disposed as being opened to the user's face side within the view field of the right eyeball $E_R$. The eyepiece optical system 31 has a front lens 92 with a positive refractive power, which is disposed so as to cover in the opening of the light receiving window 12a, an eyepiece lens 93 with a positive refractive power, which is disposed so as to cover in the eyepiece window 12b, and a light guide member 94 disposed between the front lens 92 and the eyepiece lens 93. Accordingly, the front lens 92 also functions as a window member of the light receiving window 12a.

The light guide member 94 is formed in a bar shape having an incident plane 94a, a reflecting plane 94b, and an emitting plane 94c, in which image light from the display panel 21 that has passed through the front lens 92 to be incident on the incident plane 94a is reflected on the reflecting plane 94b, and then emitted from the emitting plane 94c through the eyepiece lens 93 toward the right eyeball $E_R$. This allows the user to observe a virtual image formed by the image light.

The coupling portion 13 has a tubular member 95 formed as protruding from the light projection window 11a of the first casing 11. The second casing 12 has the incident end portion side thereof inserted into the tubular member 95 so as to be slidable in the lateral direction, so that the second casing 12 can be coupled to the first casing 11 in such a manner as to make adjustable the optical path length between the light projection window 11a and the light receiving window 12a.

According to the head-mounted display device 90 of this embodiment, when in use, the first casing 11 and the second casing 12 are integrally turned in the lateral direction about the ball joint 15a of the fixing portion 15 while the first casing 11 is slid in the lateral direction with respect to the first casing 12, to thereby allow the diopter adjustments and the interpupillary adjustment to be performed simultaneously. Further, the optical path between the light projection window 11a of the first casing 11 and the light receiving window 12a of the second casing 12 are completely enclosed by the tubular member 95, across the moving range of the second casing in the lateral direction. Therefore, the similar effects as in the case of the third embodiment can be obtained. The tubular member 95 and a portion of the second casing to be inserted into the tubular member 95 may both be in a shape of a circular cylinder or a rectangular cylinder. In the case of a circular cylinder, the orientation of the eyepiece window 12b with respect to the right eyeball $E_R$ can be adjusted through the rotation of the second casing 12 with respect to the first casing 11.

<Seventh Embodiment>

FIGS. 18A and 18B each are a view illustrating a configuration of a main part of a head-mounted display device according to a seventh embodiment of the present invention. The head-mounted display device 110 includes a casing 111, and a fixing portion 112 for attaching the casing 111 to a head support portion of a headset (not shown) or a temple of eyeglasses (not shown) on a side of the head of a wearer. The casing 111 is formed into an L-shape that has a first portion 111a extending in the anteroposterior direction of the head of the wearer and a second portion 111b extending in the lateral direction from the leading end portion of the first portion 111a to the front of the right eyeball $E_R$ of the wearer, when mounted on the right side of the head of the wearer.

The first portion 111a of the casing 111 has a display panel 113 fixed thereto, the display panel 113 serving as a display element such as a liquid crystal panel and an organic EL panel, and also has electric components disposed therein, the electric components (not shown) including a drive circuit for the display panel 113. Further, disposed in the second portion 111b of the casing 111 is an eyepiece optical system 114 with a positive refractive power, which receives image light incident from the display panel 113 to guide the image light to the front of the right eyeball $E_R$ of the wearer, so as to emit the light toward the right eyeball $E_R$, to thereby make observable a virtual image. Note that the second portion 111b has an eyepiece window 111c formed at a position through which the image light from the eyepiece optical system 114 is emitted.

The eyepiece optical system 114 has a light guide member for receiving image light incident from the display panel 113 and guiding the image light to the front of the right eyeball $E_R$, and an eyepiece lens 116 with a positive refractive power for condensing the image light emitted from the light guide member 115 and emitting the condensed image light toward the right eyeball $E_R$. The light guide member 115 is formed of a prism in a trapezoidal shape that has a first optical surface 117 with a relatively large area, a second optical surface 118 with a relatively small area which is opposed to the first optical surface 117, and a third optical surface 119 and a fourth optical surface 120 which are slanted to connect the first optical surface 117 and the second optical surface 118.

The first optical surface 117 has an incident plane 117a for the image light on one end portion thereof and an emitting plane 117 for the image light on the other end portion thereof. The light guide member 115 is disposed in such a manner that, when the casing 111 is mounted on the head of the wearer, the first optical surface 117 lies on the near side in relation to the wearer. Then, in the light guide member 115, the image light from the display panel 113 that has been made incident on the incident plane 117a of the first optical surface 117 is sequentially reflected five times on the third optical surface 119, on the first optical surface 117, on the second optical surface 118, on the first optical surface 117, and on the fourth optical surface 120, and then emitted from the emitting plane 117b of the first optical surface 117.

The eyepiece lens 116 is arranged in the emitting plane 117b of the first optical surface 117, and condenses the image light emitted from the emitting plane 117 so as to emit the condensed image light toward the right eyeball $E_R$. This allows the user to observe a virtual image formed by the image light. Here, the eyepiece window 111c is large enough to allow the eyepiece lens 116 to protrude therefrom.

The head-mounted display device 110 according to this embodiment has, inside the first portion 111a of the casing 111, a slide member 121 slidable in the extending direction of the first portion 111a, that is, in the anteroposterior direction of the head when the casing 111 is mounted on the head of the wearer. The slide member 121 is formed, for example, in a U-shape in cross section orthogonal to the slide direction so as to avoid electric components including the display panel 113 disposed in the first portion 111a and so as not to reject the image light from the display panel 113, and has the light guide member 115 coupled to the leading end portion of the slide member 121.

Further, at the posterior end portion of the slide member 121, as also illustrated in the detailed partial side view of FIG. 18A, the slide operation portion 122 is formed as being exposed outside through a guide hole 111d formed in the outside surface of the first portion 111a of the casing 111. Here, the guide hole 111d is formed as being extended in the slide direction of the slide member 121. Then, the slide member 121 can be operated through the slide operation portion 122 so as to be retained at an arbitrary slide position, with the aid of friction against the casing 111 or a known slide support mechanism (not shown).

According to the head-mounted display device 110 of this embodiment, for example, when the wearer moves the slide operation portion 122 in the anterior direction from the state illustrated in FIG. 18A, the eyepiece optical system 114 as a whole moves in the same direction integrally with the slide operation portion 122, as illustrated in FIG. 18B, within the second portion 111b of the casing 111. As a result, the optical path length between the display panel 113 and the eyepiece optical system 114, and more specifically, the optical path length between the display panel 13 and the eyepiece lens 116 is increased, so that a position of a virtual image to be formed by the image light moves further away. Therefore, the slide operation portion 122 and the virtual image move in the same direction, which allows the wearer to make diopter adjustments and image distance adjustments through an intuitive slide operation. Further, the optical length between the display panel 113 and the eyepiece optical system 114 is changed, so as to make the most of a small change in optical length to have a great effect in diopter adjustments. With this configuration, the diopter adjustments can be effectively performed, without increasing size and weight of the device. Further, the display panel 113 is fixed while the eyepiece optical system 114 is slid, and hence the slide operation does not cause the electric components to move, which is less likely to cause trouble. Further, the slide operation portion 122 is slidably provided to the outside surface of the first portion 111a of the casing 111, which allows the user to operate the slide operation portion 122 with ease without taking off the device.

<Eighth Embodiment>

FIGS. 19A and 19B each are a plan view and a side view, respectively, illustrating a configuration of a main part of a head-mounted display device according to an eighth embodiment of the present invention. The constituent elements that function similarly to those of FIG. 18 are denoted by the same reference symbols, and the description thereof is omitted. The head-mounted display device 130 has a first casing 131 and a second casing 132. The first casing 131 has a fixing portion 133, through which the device is to be attached to a head support portion of a headset or a temple of eyeglasses. FIG. 19A exemplifies a case where the fixing portion 133 is attached to a temple $T_R$ on the right side of eyeglasses EG.

The first casing 131 extends in the extending direction of the temple $T_R$, that is, in an anteroposterior direction of the head of the wearer when the eyeglasses EG is worn. The second casing 132 extends from a leading end portion of the first casing 131 to the front of the right eyeball $E_R$ of the wearer in a lateral direction at an obtuse angle to the extending direction of the first casing 131.

Figure 20:
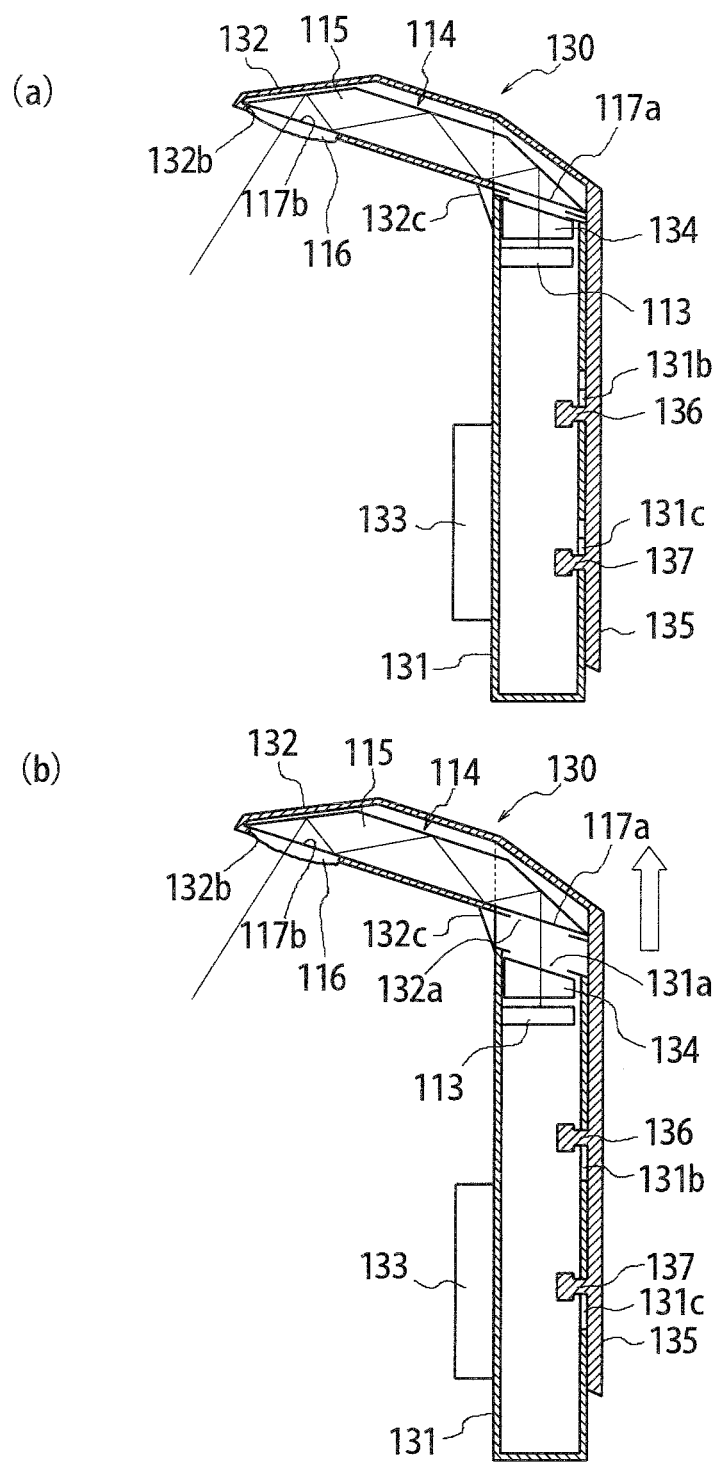
FIGS. 20A and 20B are views illustrating schematic internal configurations of a first casing and a second casing of FIGS. 19A an 19B, respectively.

The first casing 131 has a prism 134 for optical path length correction which is fixed thereto, as illustrated in FIGS. 20A and 20B, in addition to the display panel 113 and electric components (not shown). Further, the second casing 132 has the eyepiece optical system 114 fixed thereto, the eyepiece optical system 114 including the light guide member 115 and the eyepiece lens 116. Note that the first casing 131 is formed in a box shape as a whole, with an emitting window 131a being formed at a portion through which the image light is emitted. Further, the second casing 132 has an incident window 132a for the image light, which is formed at a portion corresponding to the emitting window 131a of the first casing 131, that is, a portion corresponding to the incident surface 117a of the light guide member 115, and an eyepiece window 132b for allowing the image light to pass therethrough, which is formed at a portion corresponding to the eyepiece lens 116.

Figure 21:
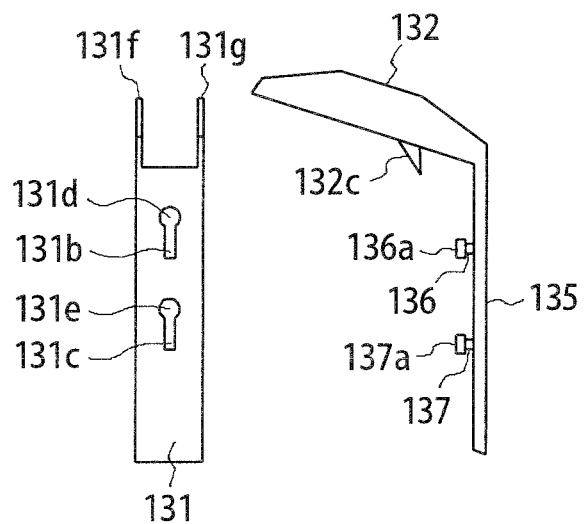
FIG. 21 is a schematic perspective view of a first casing and a second casing of FIGS. 19A an 19B which are separated from each other.

A slide operation portion 135 is provided to the second casing 132 includes so as to be slidable across the outside surface of the first casing 131 in the extending direction of the first casing 131. For this reason, as illustrated in FIG. 21 which illustrates the first casing 131 and the second casing 132 separated from each other, the slide operation portion 135 has, on a slide surface thereof, guide pins 136, 137 formed on two points in the slide direction. Further, the first casing 131 has, in the outside surface thereof, guide holes 131b, 131c with which the guide pins 136, 137 are engaged. The guide holes 131b, 131c are formed as being extended in the slide direction. The guide pins 136, 137 have flange portions 136a, 137a formed at the apex thereof, respectively, so as to prevent the guide pins 136, 137 from coming off the corresponding guide holes 131b, 131c. Further, the guide holes 131b, 131c have openings 131d, 131e formed at an end thereof so as to allow the flange portions 136a, 137a of the corresponding guide pins 136, 137 to be inserted and removed therethrough.

This configuration allows the second casing 132 to be detachably coupled to the first casing 131 via the slide operation portion 135. Then, the second casing 132 is made slidable when coupled to the first casing 131, through the slide operation of the slide member 135, in the extending direction of the first casing 131, that is, in the anteroposterior direction of the head of the wearer. Here, in order to shield external light entering through the incident window 132a of the second casing 132 across the slide operation range of the slide operation portion 135, canopies 131f, 131f are formed on the upper and lower surfaces of the first casing 131, as illustrated in FIG. 21, so as to protrude forward in such a manner as to vertically sandwich the second casing 132. Further, a canopy 132c is formed to the second casing 132 so as to laterally sandwich the leading end portion of the first casing 131 in cooperation with the slide operation portion 135.

Figure 22:
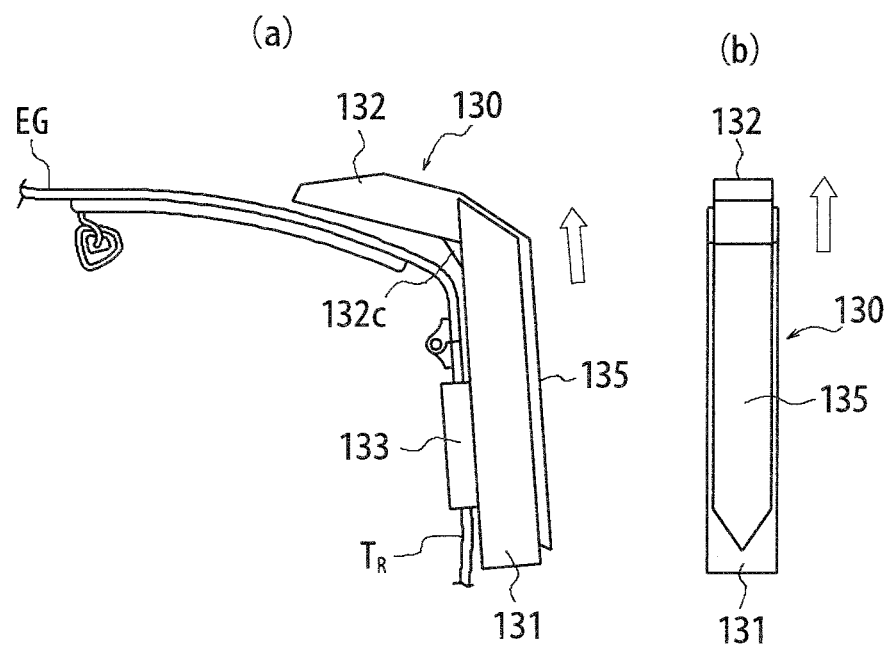
FIGS. 22A and 22B are a plan view and a side view, respectively, for illustrating a slide operation of the head-mounted display device of FIGS. 19A an 19B.

According to the head-mounted display device 130 of this embodiment, for example, when the wearer slide-operates, in the anterior direction, the slide operation portion 135 formed on the outside surface of the first casing 131 from the state illustrated in FIG. 19, the second casing 132 moves in the same direction integrally with the slide operation portion 135 as illustrated in FIGS. 22A and 22B. As a result, the distance between the display panel 113 accommodated in the first casing 131 and the eyepiece optical system 114 accommodated in the second casing 132 is changed from the state illustrated in FIG. 20A to the state illustrated in FIG. 20B, increasing the optical path length between the display panel 113 and the eyepiece lens 116, so that a position of a virtual image to be formed by the image light moves further away. Therefore, the similar effects as in the case of the seventh embodiment can be obtained. Further, external light entering the optical path due to the movement of the second casing 132 can also be shielded, which allows a virtual image to be observed with stable quality irrespective of the image distance.

<Ninth Embodiment>

Figure 23:
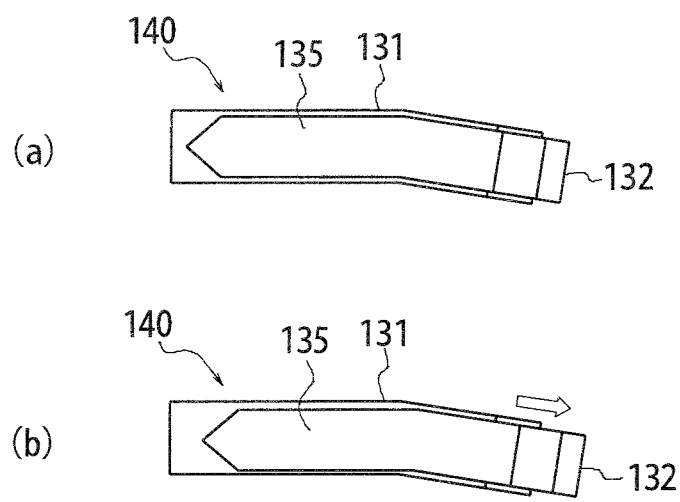
FIGS. 23A and 23B are side views illustrating a configuration of a main part of a head-mounted display device according to a ninth embodiment of the present invention.
Figure 24:
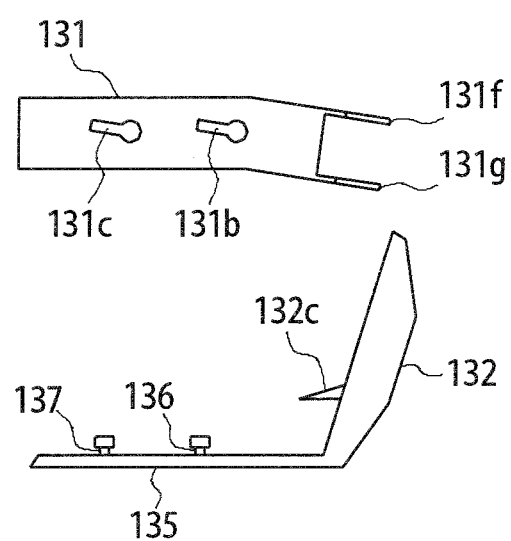
FIG. 24 is a schematic perspective view of a first casing and a second casing of FIGS. 23A and 23B which are separated from each other.

FIGS. 23 and 24 are views for illustrating a head-mounted display device according to a ninth embodiment of the present invention, in which: FIGS. 23A and 23B are side views illustrating a configuration of a main part; and FIG. 24 is a view of a first casing and a second casing which are separated from each other. The head-mounted display device 140 according to this embodiment is different from the head-mounted display device 130 according to the eighth embodiment in that the slide operation portion 135 support the second casing 132 is provided so as to be slidable with respect to the first casing 131, so that a virtual image can be observed in the line of sight sloping downward within the field of vision (view field) of the wearer, that is, in the line of sight directed slightly downward.

For this purpose, the first casing 131 is formed in such a manner that the leading end portion thereof slopes in the slide direction of the slide operation portion 135, so as to be adapted to emit the image light from the display panel 113

(see FIG. 20) in the direction of the slope. Further, the slide operation portion 135 is formed in such a manner that the leading end portion support the second casing 132 slopes in the slide direction. Similarly, the second casing 132 is supported by the slide operation portion 135 as being aslope so that the image light emitted in the direction slanting downward from the first casing 131 is made incident and the image light is guided to the front of an eyeball of the wearer so as to be emitted in obliquely upward toward the eyeball. Here, FIG. 23B illustrates the slide operation portion 135 which has been slid obliquely downward from the state of FIG. 23A.

According to the head-mounted display device 140 of this embodiment, the similar effects as in the case of the ninth embodiment can be obtained. Further, the slide operation portion 135 support the second casing 132 is configured to be slidable in such a manner that a virtual image can be observed in the line of sight directed slightly downward within the field of vision (view field) of the wearer, so that the distance to the virtual image can be adjusted while keeping a display position slightly downward which does not interfere with the front field of view, when the device is intended for constant use.

<Tenth Embodiment>

Figure 26:
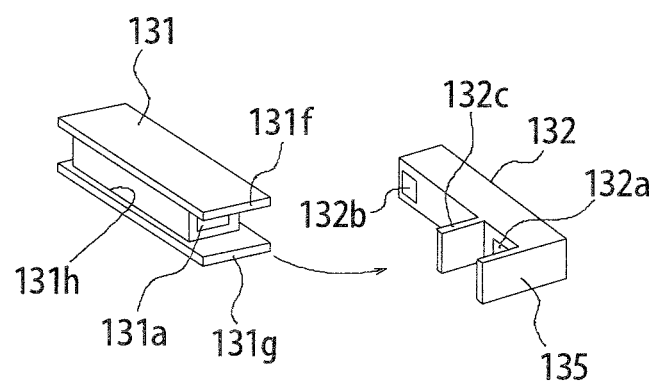
FIG. 26 is a schematic perspective view of a first casing and a second casing of FIGS. 25A and 25B which are separated from each other.
Figure 27:
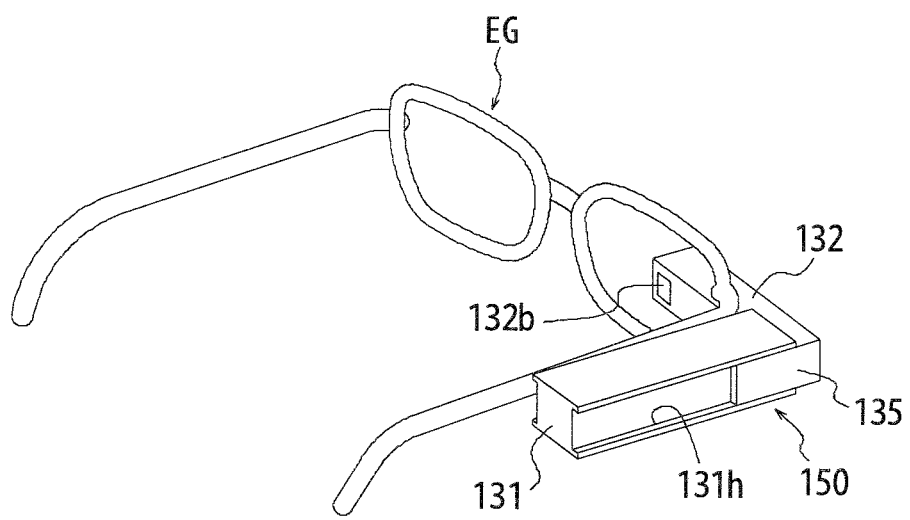
FIG. 27 is a perspective view of the head-mounted display device of FIGS. 25A and 25B attached to eyeglasses.

FIGS. 25 to 27 are views for illustrating a head-mounted display device according to a tenth embodiment of the present invention, in which: FIGS. 25A and 25B are transverse sectional views illustrating a configuration of a main part thereof; FIG. 26 is a view of the casings separated from each other; and FIG. 27 is a perspective view of the head-mounted display device attached to eyeglasses. The head-mounted display device 150 according to this embodiment is different from the head-mounted display device 130 according to the eighth embodiment mainly in terms of configuration of the eyepiece optical system. Therefore, the constituent elements that function similarly to those described with reference to the eighth embodiment are denoted by the same reference symbols, and the description thereof is omitted.

In this embodiment, the eyepiece optical system 151 has a first lens 152 with a positive refractive power, a second lens 153 with a negative refractive power, a light guide member 154 formed of a prism, and the eyepiece lens 116 with a positive refractive power. Then, image light from the display panel 113 accommodated in the first casing 131 passes through the first lens 152, the second lens 153, the light guide member 154, and the eyepiece lens 116 so as to have a positive refractive power in its entirety, and is emitted toward the right eyeball $E_R$ of the wearer.

Here, the first lens 152 is held by the emitting window 131a of the first casing 131. Further, the second lens 153, the light guide member 154, and the eyepiece lens 116 are held by the second casing 132, with the second lens 153 being cemented to the incident plane of the light guide member 154 so as to be located at the incident window 132a of the second casing 132 and the eyepiece lens 116 being cemented to the emitting plane of the light guide member 154 so as to be located at the eyepiece window 132b of the second casing 132. The light guide member 154 is configured to reflect twice the image light incident through the second lens 153 and to emit the image light through the eyepiece lens 116.

Then, as illustrated in FIGS. 25A and 25B, the slide operation portion 135 coupled to the second casing 132 is slide-operated with respect to the first casing 131, to thereby make adjustable the optical path length between the display panel 113 held by the first casing 131 and some of the optical elements (the second lens 153, the light guide member 154, and the eyepiece lens 116 in this case) held by the second casing 132 in such a manner that the optical path length is increased along with the forward displacement of the second casing 132. With this configuration, the similar effects as in the case of the eighth embodiment can be obtained. Here, FIG. 25B illustrates the slide operation portion 135 which has been slid forward from the state of FIG. 25A.

This embodiment exemplifies a case where the fixing portion 133 of the first casing 131 has a ball joint 133a and the device is fixed to the temple $T_R$ on the right side of the eyeglasses EG via the ball joint 133a. Further, FIGS. 25A and 25B exemplify a case where the first casing 131 accommodates, as electric components, a circuit board 156 having a drive circuit or the like for the display panel 113 mounted thereon, a button battery 157, and a flexible printed circuit board 158 for connecting the display panel 113 and the circuit board 156, in addition to the display panel 113. Further, exemplified in this embodiment is a case where the slide operation portion 135 coupled to the second casing 132 slides as being engaged with a guide groove 131h formed in an outside surface of the first casing 131.

<Eleventh Embodiment>

Figure 28:
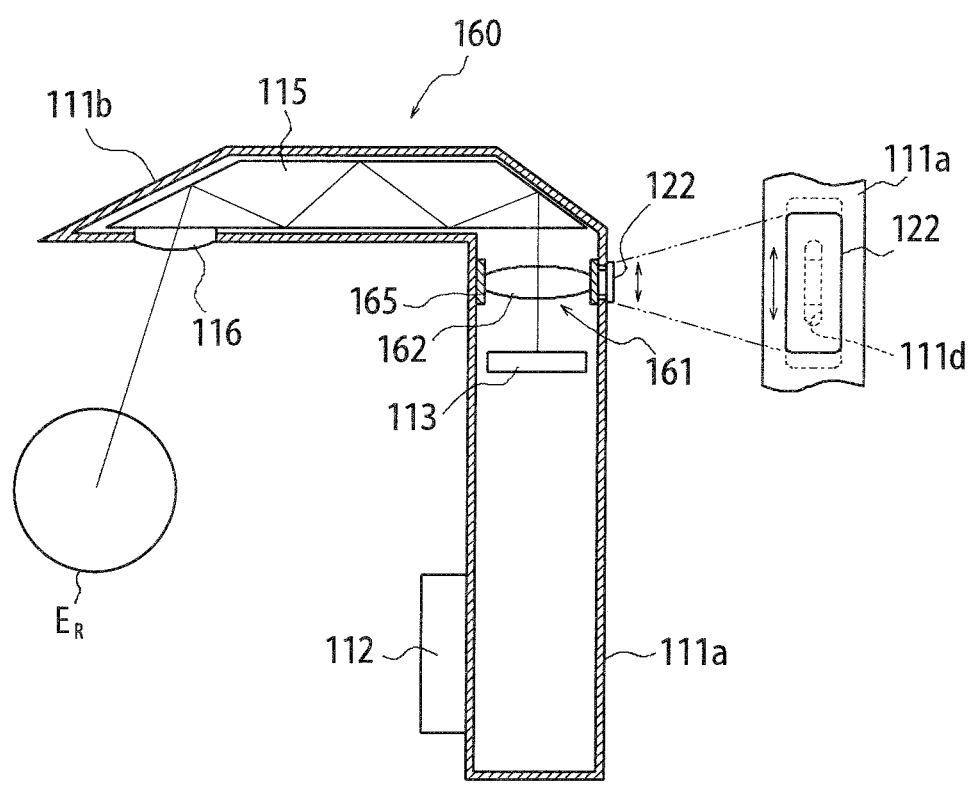
FIG. 28 is an enlarged view of a configuration of a main part of a head-mounted display device according to an eleventh embodiment of the present invention.

FIG. 28 is a view of a configuration of a main part of a head-mounted display device according to an eleventh embodiment of the present invention. The head-mounted display device 160 according to this embodiment is different from the head-mounted display device 110 according to the seventh embodiment mainly in terms of configuration of the eyepiece optical system. Therefore, the constituent elements that function similarly to those described with reference to the seventh embodiment are denoted by the same reference symbols, and the description thereof is omitted.

In this embodiment, the eyepiece optical system 161 has an inner focus lens 162 with a positive refractivity, the light guide member 115, and an eyepiece lens 116. Then, image light from the display panel 113 passes through the inner focus lens 162, the light guide member 115, and the eyepiece lens 116, and is emitted toward the right eyeball $E_R$ of the wearer.

Here, the display panel 113 is fixed to the first portion 111a of the casing 111, and the light guide member 115 and the eyepiece lens 116 are fixed to the second portion 111b of the casing 111. Further, the inner focus lens 162 is held by a lens tube 165.

The lens tube 165 is disposed so as to be slidable inside the first portion 111a in the extending direction of the first portion 111a. The lens tube 165 is provided with the slide operation portion 122 which is formed as being exposed outside, as also illustrated in the enlarged partial side view of FIG. 28, the slide operation portion 122 being coupled to the first portion 111a through a guide hall 111d formed in the outside surface of the first portion 111a. The lens tube 165 is configured to be able to retain the slide operation portion 122 at an arbitrary slide position, with the aid of friction against the casing 111 or a known slide support mechanism (not shown).

Therefore, the head-mounted display device 160 according to this embodiment, for example, when the wearer moves the slide operation portion 122 in the anterior direction, the inner focus lens 162 moves in the same direction. As a result, the optical path length between the display panel 113 and the inner focus lens 162 is increased, so that a position of a virtual image to be formed by the image light moves further away. Therefore, the similar effects can be obtained as in the case of the above-mentioned embodiment.

Figure 29:
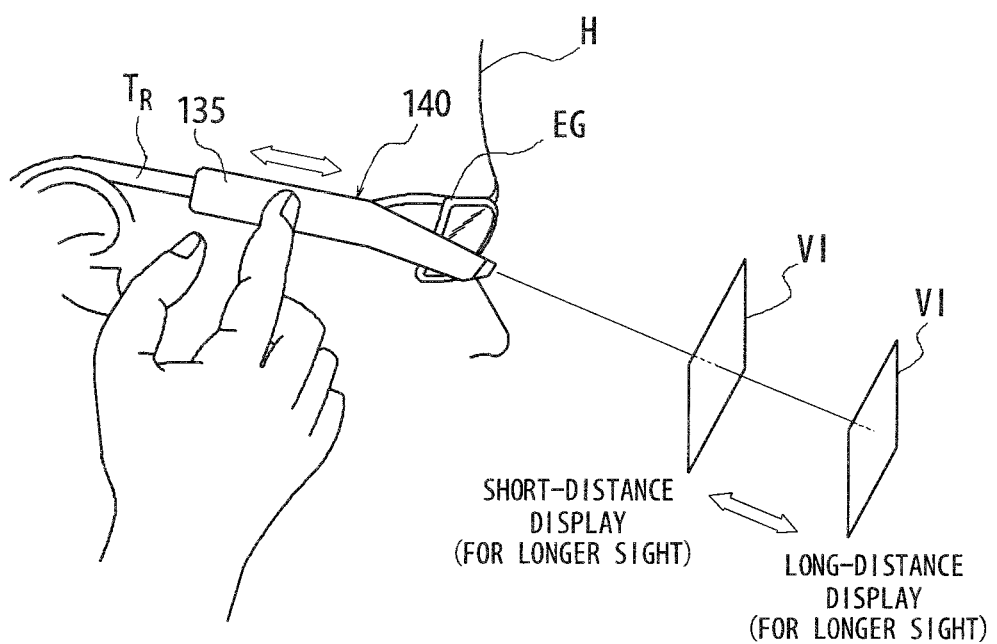
FIG. 29 is a view for illustrating how a distance to the virtual image is changed in the head-mounted display device according to the present invention.

FIG. 29 is a view for illustrating how a distance to the virtual image is changed in the head-mounted display device according to the present invention. Here, FIG. 29 exemplifies a case where the head-mounted display device 140 described with reference to the ninth embodiment is attached to the temple $T_R$ on the right side of the eyeglasses EG. As described with reference to the above-mentioned embodiments, in the head-mounted display device according to the present invention, a virtual image VI moves further away when the slide operation portion 135 is slid forward while the virtual image VI draws closer when the slide operation portion 135 is slid backward. Here, the distance from a wearer H to the virtual image VI may range from infinity to about 30 cm. However, in view of the use application of the device, that is, the device is intended to be worn constantly under various environments, the virtual image VI may preferably be displayed in the distance of about 2 m to 3 m away when a user uses the display device for displaying town information while walking outside. On the other hand, when the user uses the device at one's desk at work, the virtual image VI may preferably be displayed at a short distance of about 50 cm to 1 m. In this manner, the virtual image can be visually identified smoothly without experiencing a significant change in visibility in contrast to the surrounding environment.

Figure 30:
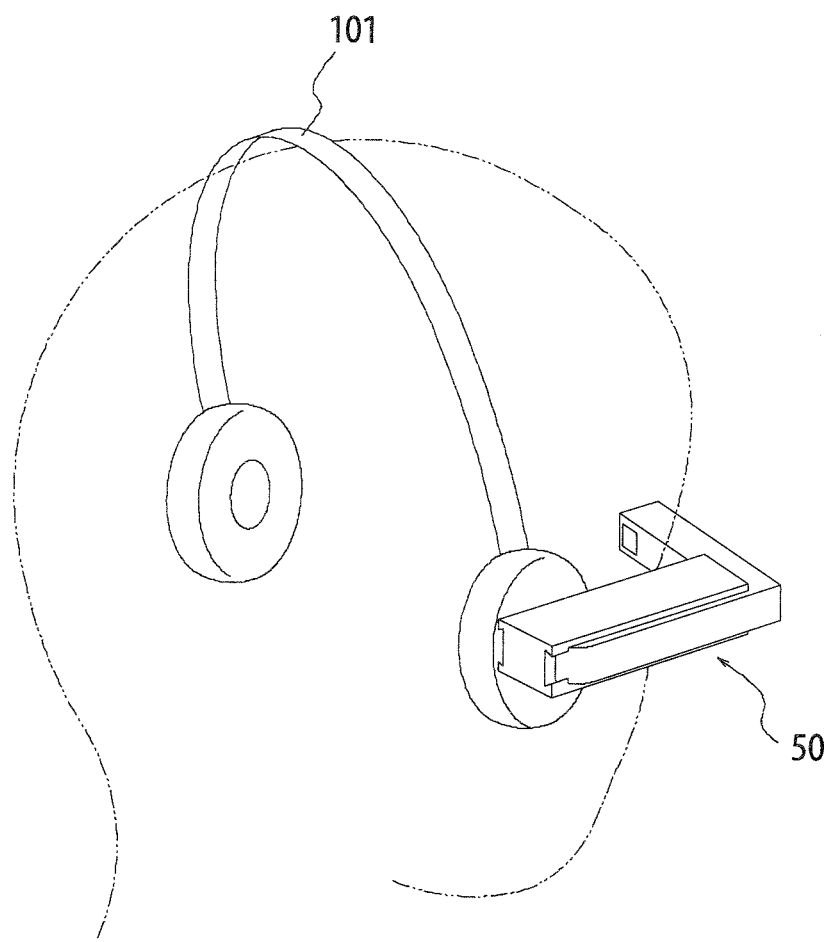
FIG. 30 is a view illustrating the head-mounted display device according to the present invention attached for use to headphones.

It should be noted that the present invention is not limited only to the above-mentioned embodiments, and may be subjected to various changes and modifications. For example, the head-mounted display device according to the present invention can not only be attached to eyeglasses for use but also be attached to headphones 101 which is to be mounted on the head of a user, as illustrated in FIG. 30. Here, FIG. 30 exemplifies a case where the head-mounted display device 50 described with reference to the second embodiment is attached for use to the headphones 101.

Further, in the seventh to ninth embodiments and in the eleventh embodiment, the number of times light is reflected in the light guide member 115 is not limited to five times, but may be arbitrarily set to more than one time, such as twice or three times. Similarly, the number of times light is reflected in the light guide member 154 of the tenth embodiment is not limited to twice, but may be arbitrarily set to more than one time, such as three times or five times.

Further, in the eighth embodiment described above, a guide groove may be formed in the first casing 131, similarly to the tenth embodiment, so that the slide operation portion 135 may be configured as slidable through the engagement with the guide groove. Further, in the above-mentioned embodiments, the slide operation portion may be provided, in a slidable manner, not only to the outside surface side of the casing but also to an upper surface side or a lower surface side of the casing.

Further, in the above-mentioned embodiments, the display panel is fixed and at least some of the optical elements of the eyepiece optical system are moved through the slide operation of the slide operation portion. However, the device may also be configured in such a manner as to cause only the display panel to be moved, or both of the display panel and at least some optical elements of the optical system to be moved. Here, in the case of moving the display panel, the display panel is configured to move backward when the slide operation portion is moved forward, so that the optical path to the eyepiece optical system can be increased. Further, the present invention can employ, as the display element, a display element for emitting image light at a pixel level, other than the above-mentioned display panel for emitting two-dimensional image light, so that the device can be effectively applied to a case of displaying an image in an observable manner through two-dimensional scanning of the image light.

Description of Symbols
10, 50, 60, 70, 80, 90 head-mounted display device
11 first casing
11a light projection window
11f, 11g light shielding member
12 second casing
12a light receiving window
12b eyepiece window
12c light shielding member
13 coupling portion
21 display panel
25 window pane
31 eyepiece optical system
32 prism
33, 54, 93 eyepiece lens
34, 53, 94 light guide member
41, 55, 71 slide member
42, 43 guide hole
44, 45 guide pin
51 first lens
52 second lens
55a operation portion
61 tubular member
91 total reflecting prism
92 front lens
101 headphones
110, 130, 140, 150, 160 head-mounted display device
111 casing
111a first portion
111b second portion
111c eyepiece window
111d guide hole
112 fixing portion
113 display panel
114 eyepiece optical system
115 light guide member
116 eyepiece lens
117a incident plane
117b emitting plane
121 slide member
122 slide operation portion
131 first casing
131a emitting window
131b, 131c guide hole
131f, 131g canopy
132 second casing
132a incident window
132b eyepiece window
132c canopy
133 fixing portion
133a ball joint
134 prism
135 slide operation portion
136, 137 guide pin
151 eyepiece optical system
152 first lens
153 second lens
154 light guide member
161 eyepiece optical system
162 inner focus lens
165 lens tube
$E_R$ right eyeball
EG eyeglasses
$T_R$ temple
VI virtual image
H wearer

The invention claimed is:
1. A head-mounted display device, comprising:
a first casing which incorporates therein at least a display element, and has a light projection window for projecting image light from the display element;

a second casing which incorporates therein an eyepiece optical system with a refractive power, and has a light receiving window for receiving the incident image light projected through the light projection window and an eyepiece window for emitting the image light that has passed through the eyepiece optical system; and a coupling portion for coupling the second casing to the first casing so as to make adjustable a length of an optical path between the light projection window and the light receiving window; and wherein the first casing has a guide outside a surface of the first casing; and wherein the coupling portion has a slide member which is provided to the second casing and to be guided along the guide so as to be slidably coupled to the first casing.

2. The head-mounted display device according to claim 1, wherein the first casing is held, when in use, on the side of the head of a user so that the light projection window opens to the same side as the face of the user is directed; and wherein the second casing is arranged, when in use, so that the light receiving window and the eyepiece window open to the face side of the user.

3. The head-mounted display device according to claim 1, wherein the first casing and the second casing each have a light shielding member so as to shield external light entering the optical path between the light projection window and the light receiving window, across a slide range of the slide member.

4. The head-mounted display device according to claim 3, wherein the slide member also serves as the light shielding member of the second casing.

5. The head-mounted display device according to claim 1, wherein the slide member is provided so as to enclose the optical path between the light projection window and the light receiving window.

6. The head-mounted display device according to claim 3, wherein the slide member is detachably attached to the first casing.

7. The head-mounted display device according to claim 1, further comprising a window member transparent with respect to image light from the display element, the window member being provided so as to cover in at least one of the light projection window and the light receiving window.

8. The head-mounted display device according to claim 1, wherein the first casing is held, when in use, on the side of the head of the user so that the light projection window opens inward along the lateral direction with respect to the face of the user; and wherein the second casing is arranged, when in use, so that the light receiving window opens outward along the lateral direction with respect to the face of the user and the eyepiece window opens to the face side of the user within a view field of an eyeball in the vicinity of the first casing, in front of the face of the user.

9. The head-mounted display device according to claim 1, wherein the first casing is held, when in use, on the side of the head of the user so that the light projection window opens inward along the lateral direction with respect to the face of the user;

wherein the second casing is arranged, when in use, so that the light receiving window opens outward along the lateral direction with respect to the face of the user and the eyepiece window opens to the face side of the user; and wherein the coupling portion couples the second casing to the first casing in such a manner that the second casing is slidable in the lateral direction with respect to the user.

10. The head-mounted display device according to claim 1, wherein the eyepiece optical system has a positive refractive power and receives the image light incident from the display element, guides the image light to the front of an eyeball of a wearer, and emits the image light toward the eyeball, so as to make observable a virtual image formed by the image light;

wherein the head-mounted display device includes a slide operation portion which is provided so as to be slidable, with respect to the first casing, in an anteroposterior direction of the head of the wearer; and wherein the slide operation portion is coupled to at least either the display element or an optical element in the eyepiece optical system in such a manner that the length of the optical path between the display element and the optical element is increased when the slide operation portion is slid in the anterior direction of the wearer.

11. The head-mounted display device according to claim 10, wherein the display element is fixed to the first casing;

wherein the optical element is fixed to the second casing; and wherein the slide operation portion is slidably provided to the first casing and coupled to the second casing so as to be attached to the optical element via the second casing.

12. The head-mounted display device according to claim 11, wherein the slide operation portion is provided so as to be slidable across an outside surface of the first casing.

13. The head-mounted display device according to claim 12, wherein the slide operation portion is provided so as to be slidable with respect to the first casing so that a virtual image can be observed in the line of sight that slopes downward within a view field of the wearer.

14. A head-mounted display device, comprising:
a display element;
a casing accommodating the display element;
an eyepiece optical system with a positive refractive power, which receives image light incident from the display element, guides the image light to the front of an eyeball of the wearer, and emits the image light toward the eyeball, so as to make observable a virtual image formed by the image light; and
a slide operation portion which is provided so as to be slidable, with respect to the casing, in the anteroposterior direction of the head of the wearer,
wherein the slide operation portion is coupled to at least either the display element or an optical element in the eyepiece optical system in such a manner that a length of an optical path between the display element and the optical element is increased when the slide operation portion is slid in the anterior direction of the wearer;
wherein the casing has a first casing and a second casing;
wherein the display element is fixed to the first casing;
wherein the optical element is fixed to the second casing; and
the first casing has a light shielding member so as to shield external light entering the optical path between the first casing and the second casing, across a slide range of the slide member.

15. The head-mounted display device according to claim 14, wherein the optical element includes a light guide member that has an incident plane for receiving the image light incident from the display element and an emitting plane for emitting the image light toward the eyeball of the wearer, the incident plane and the emitting plane being located on the near side in relation to the wearer.

16. The head-mounted display device according to claim 14, wherein the slide operation portion is slidably provided to the first casing and coupled to the second casing so as to be attached to the optical element via the second casing.

17. The head-mounted display device according to claim 16, wherein the slide operation portion is provided so as to be slidable across an outside surface of the first casing.

18. The head-mounted display device according to claim 17, wherein the slide operation portion is provided so as to be slidable with respect to the first casing so that a virtual image can be observed in the line of sight that slopes downward within a view field of the wearer.

* * * * *